US012502605B2

(12) United States Patent
Zhao et al.

(10) Patent No.: US 12,502,605 B2
(45) Date of Patent: Dec. 23, 2025

(54) VIRTUAL PICTURE DISPLAY METHOD AND APPARATUS, DEVICE, MEDIUM, AND COMPUTER PROGRAM PRODUCT

(71) Applicant: Tencent Technology (Shenzhen) Company Limited, Shenzhen (CN)

(72) Inventors: Qi Zhao, Shenzhen (CN); Hengshun Zhan, Shenzhen (CN); Guanlin Huang, Shenzhen (CN); Jingxuan Chen, Shenzhen (CN); Mingwei Zou, Shenzhen (CN); Zihan Zhou, Shenzhen (CN); Ru Xiao, Shenzhen (CN); Xu Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 266 days.

(21) Appl. No.: 18/213,730

(22) Filed: Jun. 23, 2023

(65) Prior Publication Data

US 2023/0330535 A1 Oct. 19, 2023

Related U.S. Application Data

(63) Continuation of application No. PCT/CN2022/108731, filed on Jul. 28, 2022.

(30) Foreign Application Priority Data

Sep. 3, 2021 (CN) ......................... 202111032275.X

(51) Int. Cl.
*A63F 13/533* (2014.01)
*A63F 13/52* (2014.01)
(Continued)

(52) U.S. Cl.
CPC ............ *A63F 13/533* (2014.09); *A63F 13/52* (2014.09); *A63F 13/537* (2014.09); *A63F 13/55* (2014.09); *A63F 13/837* (2014.09)

(58) Field of Classification Search
CPC ...... A63F 13/533; A63F 13/537; A63F 13/52; A63F 13/55; A63F 13/837
See application file for complete search history.

(56) References Cited

U.S. PATENT DOCUMENTS 5,393,074 A * 2/1995 Bear ..................... A63F 9/0291 472/66
5,590,062 A * 12/1996 Nagamitsu ............. G06F 3/011 715/848

(Continued)

FOREIGN PATENT DOCUMENTS

| | | |
|---|---|---|
| CN | 112337089 A | 2/2021 |
| CN | 113230652 A | 8/2021 |
| CN | 113680060 A | 11/2021 |

OTHER PUBLICATIONS

FyreWulf, "Perfect Dark: Xray Vision",2012, Youtube.com, pp. 1-3, at https://www.youtube.com/watch?v=mQpxRfr7Tn4 (last visited May 13, 2025) (Year: 2012).*

(Continued)

*Primary Examiner* — Steve Rowland
(74) *Attorney, Agent, or Firm* — Morgan, Lewis & Bockius LLP

(57) ABSTRACT

This application discloses a virtual picture display method performed by a computer device. The method includes: displaying a virtual environment picture, the virtual environment picture comprising a first object and a virtual prop controlled by a first virtual object; receiving an interaction operation for the first virtual object to interact with the first object by using the virtual prop, and the first region comprising a first environment element; in response to the (Continued)

interaction operation and the first object meeting an environment switching condition, displaying an element switching process of switching a first environment element located in a first region of the virtual environment to a second environment element; and in response to completion of the element switching process, displaying the second environment element located in the first region of the virtual environment.

20 Claims, 13 Drawing Sheets

(51) Int. Cl.

| | |
|---|---|
| ***A63F 13/537*** | (2014.01) |
| ***A63F 13/55*** | (2014.01) |
| *A63F 13/837* | (2014.01) |

(56) References Cited

U.S. PATENT DOCUMENTS

| | | | | |
|---|---|---|---|---|
| 5,769,718 | A * | 6/1998 | Rieder | A63F 13/52 463/31 |
| 6,030,289 | A * | 2/2000 | Nomi | G06T 15/50 463/31 |
| 6,413,163 | B1 * | 7/2002 | Yamauchi | A63F 13/10 463/31 |
| 6,612,930 | B2 * | 9/2003 | Kawagoe | A63F 13/5258 463/33 |
| 6,614,436 | B2 * | 9/2003 | Kawakami | A63F 13/843 345/474 |
| 7,115,031 | B2 * | 10/2006 | Miyamoto | A63F 13/26 463/31 |
| 7,594,847 | B1 * | 9/2009 | York | A63F 13/48 463/2 |
| 7,762,891 | B2 * | 7/2010 | Miyamoto | A63F 13/26 463/31 |
| 8,740,700 | B2 * | 6/2014 | Shikata | A63F 13/92 463/31 |
| 8,882,593 | B2 * | 11/2014 | Yamashita | A63F 13/52 463/31 |
| 2002/0054018 | A1 * | 5/2002 | Yamaguchi | A63F 13/5255 345/157 |
| 2004/0229687 | A1 * | 11/2004 | Miyamoto | A63F 13/843 463/30 |
| 2006/0135256 | A1 * | 6/2006 | Toyama | A63F 13/25 463/31 |
| 2018/0256977 | A1 * | 9/2018 | Wakasono | A63F 13/54 |
| 2019/0240570 | A1 | 8/2019 | Kuwatani et al. | |

OTHER PUBLICATIONS

CSGO,"Tactical Teaching: Test Experiment of the Power of Gun Bullets Through Walls", TGBUS Corporation, Oct. 16, 2020, 2 pgs., Retrieved from the Internet: http://csgo.tgbus.com/new/410243.shtml.

Tencent Technology, ISR, PCT/CN2022/108731, Oct. 21, 2022, 3 pgs.

Tencent Technology, WO, PCT/CN2022/108731, Oct. 21, 2022, 5 pgs.

Tencent Technology, IPRP, PCT/CN2022/108731, Mar. 5, 2024, 6 pgs.

* cited by examiner

VIRTUAL PICTURE DISPLAY METHOD AND APPARATUS, DEVICE, MEDIUM, AND COMPUTER PROGRAM PRODUCT

CROSS-REFERENCE TO RELATED APPLICATIONS

This application is a continuation application of PCT Patent Application No. PCT/CN2022/108731, entitled "VIRTUAL PICTURE DISPLAY METHOD AND APPARATUS, DEVICE, MEDIUM, AND COMPUTER PROGRAM PRODUCT" filed on Jul. 28, 2022, which claims priority to Chinese Patent Application No. 202111032275.X, entitled "VIRTUAL PICTURE DISPLAY METHOD AND APPARATUS, DEVICE, MEDIUM, AND COMPUTER PROGRAM PRODUCT" filed on Sep. 3, 2021, all of which is incorporated herein by reference in its entirety.

FIELD OF THE TECHNOLOGY

This application relates to the field of virtual environment technologies, and in particular, to a virtual picture display method and apparatus, a device, a medium, and a computer program product.

BACKGROUND OF THE DISCLOSURE

With the rapid development of computer technology and the diversification of terminals, the application of electronic games has become more and more extensive. Shooting game is a relatively popular game, in which a virtual scene is displayed on a terminal, and a user can control a virtual object in a virtual scene to interact and fight with virtual objects controlled by other users.

In related art, during a game battle, the virtual object controlled by the user is always in a virtual environment for combat, and the user changes the current virtual environment picture by controlling the virtual object to move or change the perspective.

However, in the above-mentioned method, during a game, the user can choose only one virtual environment for combat, and the scene display is relatively simple. After multiple battles in the same virtual environment, the user will form a fixed combat mode, thus the game has relatively bad experience of repetition.

SUMMARY

Embodiments of this application provide a virtual picture display method and apparatus, a device, a medium, and a computer program product. The technical solutions are as follows:

According to one aspect, a virtual picture display method is performed by a computer device, the method including:

displaying a virtual environment picture, the virtual environment picture comprising a first object and a virtual prop controlled by a first virtual object;

receiving an interaction operation for the first virtual object to interact with the first object by using the virtual prop, and the first region comprising a first environment element;

in response to the interaction operation and the first object meeting an environment switching condition, displaying an element switching process of switching a first environment element located in a first region of the virtual environment to a second environment element; and in response to completion of the element switching process, displaying the second environment element located in the first region of the virtual environment.

According to another aspect, a computer device is provided, the computer device including a processor and a memory, the memory storing at least one instruction, and the at least one instruction being loaded and executed by the processor and causing the computer device to implement the virtual picture display method according to any one of the embodiments of this application.

According to another aspect, a non-transitory computer-readable storage medium is provided, the computer-readable storage medium storing at least one program code, and the program code being loaded and executed by a processor of a computer device and causing the computer device to implement the virtual picture display method according to any one of the embodiments of this application.

The technical solutions provided in this application may include the following beneficial effects:

A virtual environment picture including a first region is displayed from a perspective of a first virtual object, the first region including a first environment element; the first environment element in the first region is switched to a second environment element through an interaction operation for the first virtual object to interact with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

DESCRIPTION OF EMBODIMENTS

Figure 1:
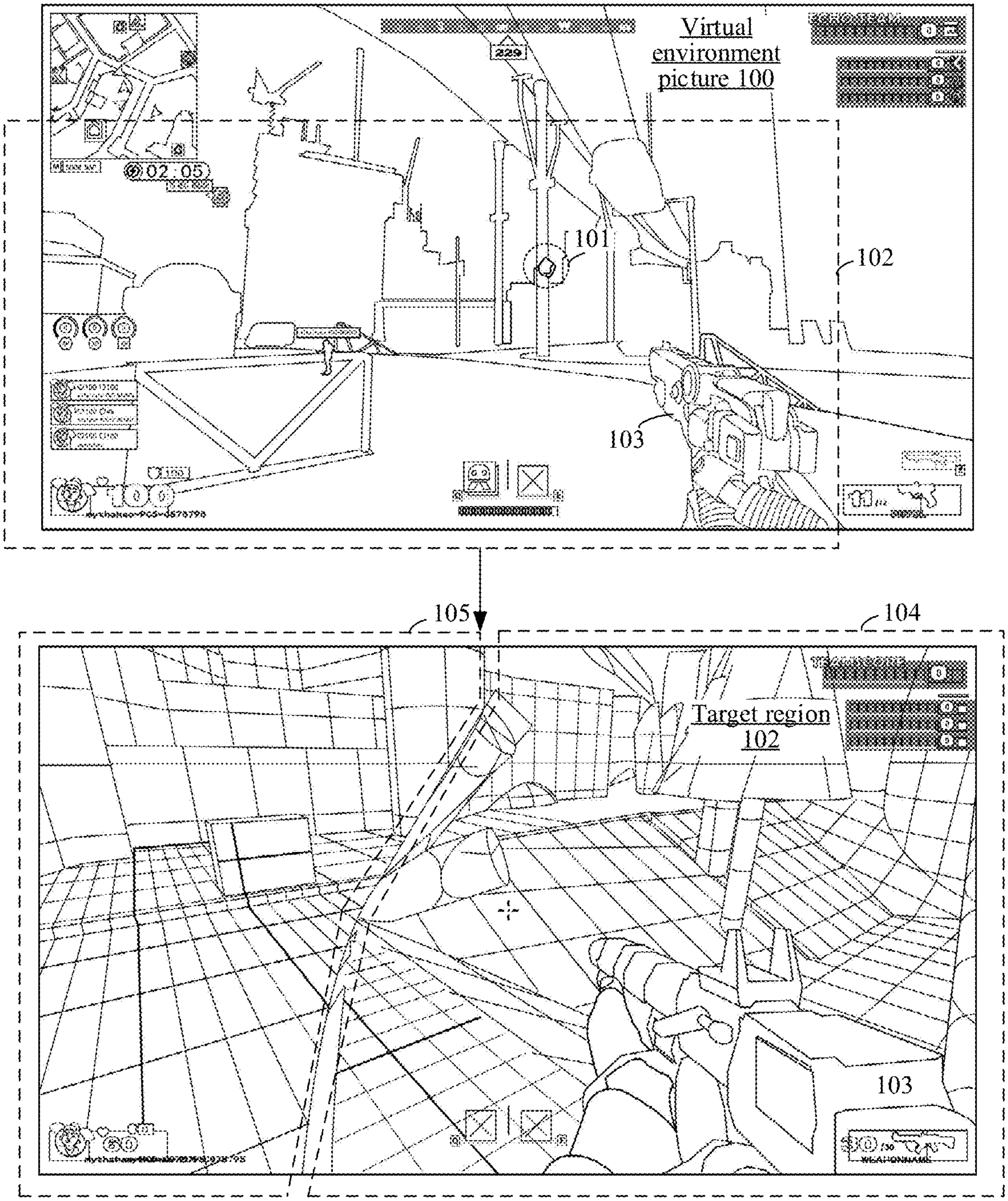
FIG. 1 is a schematic diagram of a virtual picture display method according to an exemplary embodiment of this application.

First, terms involved in the embodiments of this application are briefly introduced.

Virtual environment: referring to a virtual environment displayed (or provided) when an application program is running on a terminal. The virtual environment may be a simulated environment for the real world, a semi-simulated and semi-fictional three-dimensional environment, or an entirely fictional three-dimensional environment. The virtual environment may be any one of a two-dimensional virtual environment, a 2.5-dimensional virtual environment and a three-dimensional virtual environment. The following embodiments are described by taking the virtual environment being a three-dimensional virtual environment as an example, but this is not limited thereto. In some embodiments, the virtual environment is also used for a virtual environment battle between at least two virtual characters. In some embodiments, the virtual environment has virtual resources available for at least two virtual characters.

Virtual object: referring to a movable object in a virtual scene. The movable object may be at least one of a virtual character, a virtual animal, and a cartoon character. In some embodiments, when the virtual scene is a three-dimensional virtual scene, the virtual object may be a three-dimensional solid model. Each virtual object has its own shape and volume in the virtual scene, and occupies a part of the space in the three-dimensional virtual scene. In some embodiments, the virtual character is a three-dimensional character based on three-dimensional human skeleton technology, and the virtual character realizes different external images by wearing different skins. In some implementations, the virtual character may also be implemented using a 2.5-dimensional or 2-dimensional model, and this is not limited in the embodiments of this application.

Virtual prop: referring to a prop that a virtual object can use in a virtual environment, including at least one of a virtual weapon, a functional prop, and virtual equipment. Schematically, the virtual prop in this application includes a virtual weapon, and the virtual weapon is used for changing an attribute value of the virtual object in the virtual environment. For example, shooting type virtual props such as pistols, rifles, sniper rifles, bows and arrows, close attack type virtual props such as daggers and hammers, and throwing type virtual props such as grenades, missiles, flash bombs, and smoke bombs. The throwing type virtual props are virtual props that are thrown toward a certain direction or location by virtual objects or other virtual vehicles, and take effect after reaching throwing points or colliding. The virtual prop further includes a first object, and elements in the virtual environment can be switched through the first object to change the virtual environment. The first object may be a type of virtual props set in the virtual environment.

Origin: referring to, in this application, a center point where element switching occurs in the virtual environment, namely, the starting point of a pulse layer.

Pulse: referring to, in this application, a spherical shock wave emitted from a center point where element switching occurs in the virtual environment during a single game, where the spherical shock wave continues to diffuse outward, and stops diffusing and disappears once reaching a range set in advance.

Slice: referring to, in this application, that a virtual model is displayed or disappeared in the form of slices one by one in a pulse switching mode during a game battle.

A game based on a virtual environment is often composed of a map of one or more game worlds. The virtual environment in the game simulates the scene of the real world. A user can control a virtual object in the game in the virtual environment to perform actions such as running, walking, jumping, shooting, fighting, driving, switching the use of virtual props, and using virtual props to harm other virtual objects. The user can also control the virtual object to use throwing props to interact with virtual objects controlled by other users. In some embodiments, the throwing props include: grenades, smoke bombs, stun grenades, sticky grenades, etc. However, in a single game, the user can only choose a map of a single game world for the game, and the types of environment elements in each map are fixed. For example: desert terrain only appears on desert maps, snow terrain only appears on snow maps, rain forest houses only appear on rain forest maps, and so on. Therefore, after multiple game combats in the same map, users will form a fixed form of combat, and the environment elements of the virtual environment are also relatively monotonous, resulting in reduction of game fun and freshness of the users.

The embodiments of this application provide a virtual picture display method, where a virtual environment picture including a first region is displayed from a perspective of a first virtual object, the first region including a first environment element; the first environment element is switched to a second environment element through an interaction operation for the first virtual object to interact with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

FIG. 1 shows a schematic diagram of a virtual picture display method according to an exemplary embodiment of this application. As shown in FIG. 1, a current virtual environment picture 100 is displayed. The virtual environment picture 100 includes a first object 101. A user controls a virtual object 103 to perform an interaction operation with the first object 101, thereby triggering an environment switching function of the first object 101 for a first environment element in a first region 102. When the virtual object 103 controlled by the user is located in the first region 102, and the first object 101 triggers the environment switching function, the current virtual environment picture 100 can display an environment switching process. The environment switching process is an element switching process from the first environment element in the first region 102 to a second environment element. The element switching process is displayed in a pulse switching mode. The display picture is the environment switching process from an old environment 104 including the first environment element to a new environment 105 including the second environment element.

Figure 2:
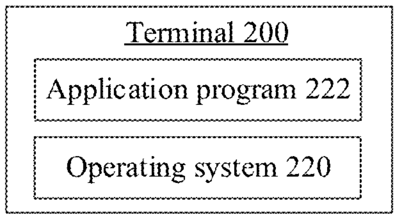
FIG. 2 is a structural block diagram of an electronic device according to an exemplary embodiment of this application.

FIG. 2 shows a structural block diagram of an electronic device according to an exemplary embodiment of this application. The electronic device 200 includes: an operating system 220 and an application program 222.

The operating system 220 is basic software that provides the application program 222 with secure access to computer hardware.

The application program 222 is an application program supporting a virtual environment. In some embodiments, the application program 222 is an application program supporting a three-dimensional virtual environment. The application program 222 may be any one of a virtual reality application program, a third-person shooting game (TPS), a first-person shooting game (FPS), multiplayer online battle arena games (MOBA), and a multiplayer gunfight survival game. The application program 222 may be a stand-alone version of application program, such as a stand-alone version of 3D game program, or an online version of application program.

Figure 3:
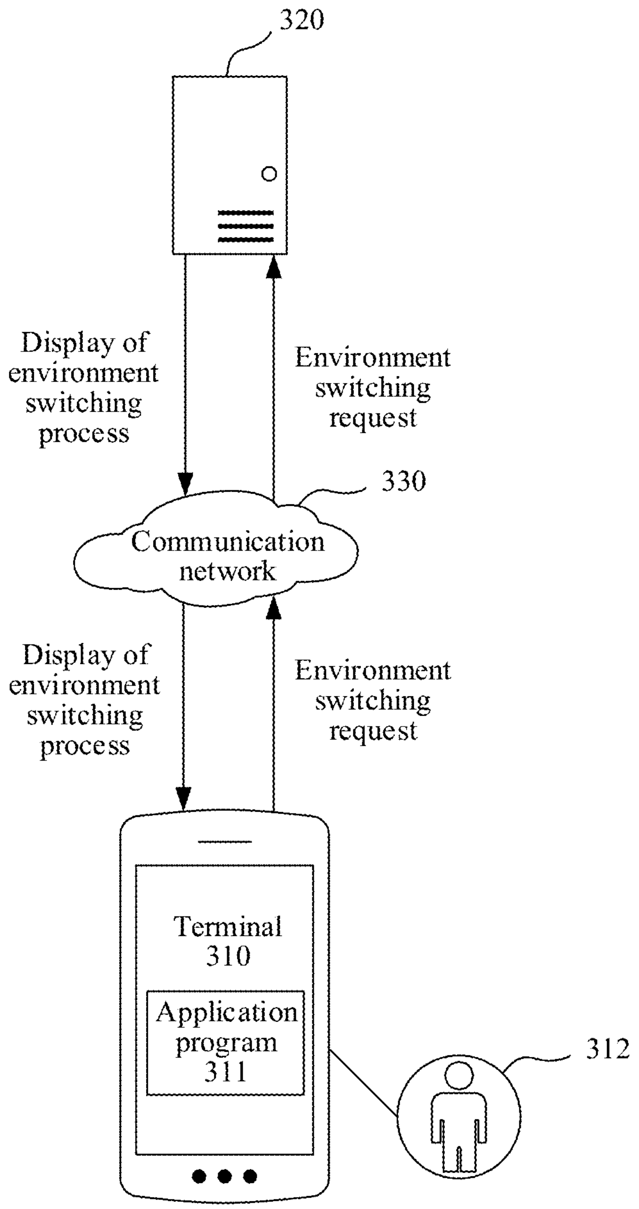
FIG. 3 is a schematic diagram of an implementation environment according to an exemplary embodiment of this application.

FIG. 3 shows a schematic diagram of an implementation environment according to an exemplary embodiment of this application. Schematically, the implementation environment includes: a terminal 310, a server 320, and a communication network 320.

An application program 311 supporting a virtual environment is installed and run in the terminal 310. When the terminal runs the application program 311, a user interface of the application program 311 is displayed on a screen of the terminal 310. The application program 311 may be any one of a MOBA game, a TPS game, and a multiplayer gunfight survival game. In this embodiment, the application program 311 being an FPS game is taken as an example for illustration. The terminal 310 is a terminal used by a user 312. The user 312 uses the terminal 310 to control a virtual object located in the virtual environment to perform activities, and the virtual object may be called a master virtual object of the user 312. The activities of the virtual object include, but are not limited to: at least one of adjusting body posture, crawling, walking, running, jumping, driving, picking up, shooting, attacking, throwing, or releasing skills. Schematically, the virtual object is a virtual character, such as a simulated character or a cartoon character.

The terminal in this application may be a desktop computer, a laptop portable computer, a mobile phone, a tablet computer, an e-book reader, a Moving Picture Experts Group Audio Layer III (MP3) player, a Moving Picture Experts Group Audio Layer IV (MP4) player, or the like. An application program supporting a virtual environment, such as an application program supporting a three-dimensional virtual environment, is installed and run in the terminal. The application program may be any one of a virtual reality application program, a TPS game, an FPS game, and a MOBA game. In some embodiments, the application program may be a stand-alone version of application program, such as a stand-alone version of 3D game program, or an online version of application program.

In some embodiments, the terminal 310 generates an environment switching request after receiving an interaction operation from the user, and sends the environment switching request to the server 320. The environment switching request includes an environment switching operation request and information about elements requiring environment switching. The server 320 selects, through the current environment switching operation request, the elements requiring environment switching to perform element switching, and sends environment switching process display to the terminal 310.

A person skilled in the art may know that the number of the above-mentioned devices may be more or less. For example, the number of the above-mentioned device may be only one, or the number of the above-mentioned devices may be dozens or hundreds, or more. The number and types of the devices are not limited in the embodiments of this application.

The server 320 may be an independent physical server, or a server cluster or distributed system composed of a plurality of physical servers, or a cloud server that provides cloud services, cloud databases, cloud computing, cloud functions, cloud storage, network services, cloud communications, middleware services, domain name services, security services, content delivery network (CDN), and basic cloud computing services such as big data and artificial intelligence platforms.

Cloud technology refers to a hosting technology that unifies a series of resources such as hardware, software, and networks in a wide area network or a local area network to realize data computing, storage, processing, and sharing. Cloud technology is a general term for network technology, information technology, integration technology, management platform technology, application technology, etc. based on cloud computing business model applications, and can form a resource pool, which can be used on demand, and is thus flexible and convenient. Cloud computing technology will become an important support. Background services of technical network systems require lots of computing and storage resources, such as websites, picture websites and more portal websites. With the high development and application of the Internet industry, in the future, each item may have its own identification mark, which needs to be transmitted to a background system for logical processing. Different levels of data will be processed separately, and all kinds of industry data require a strong system backing support, and can only be realized through cloud computing.

In some embodiments, the server 320 can also be implemented as a node in a blockchain system. Blockchain is a new application mode of computer technology such as distributed data storage, point-to-point transmission, consensus mechanism, and encryption algorithm. Blockchain, essentially a decentralized database, is a string of data blocks associated with each other by using cryptographic methods, and each data block contains information of a batch of network transactions, which is used for verifying the validity (anti-counterfeiting) of information thereof and generating the next block. The blockchain may include a blockchain underlying platform, a platform product service layer, and an application service layer.

Figure 4:
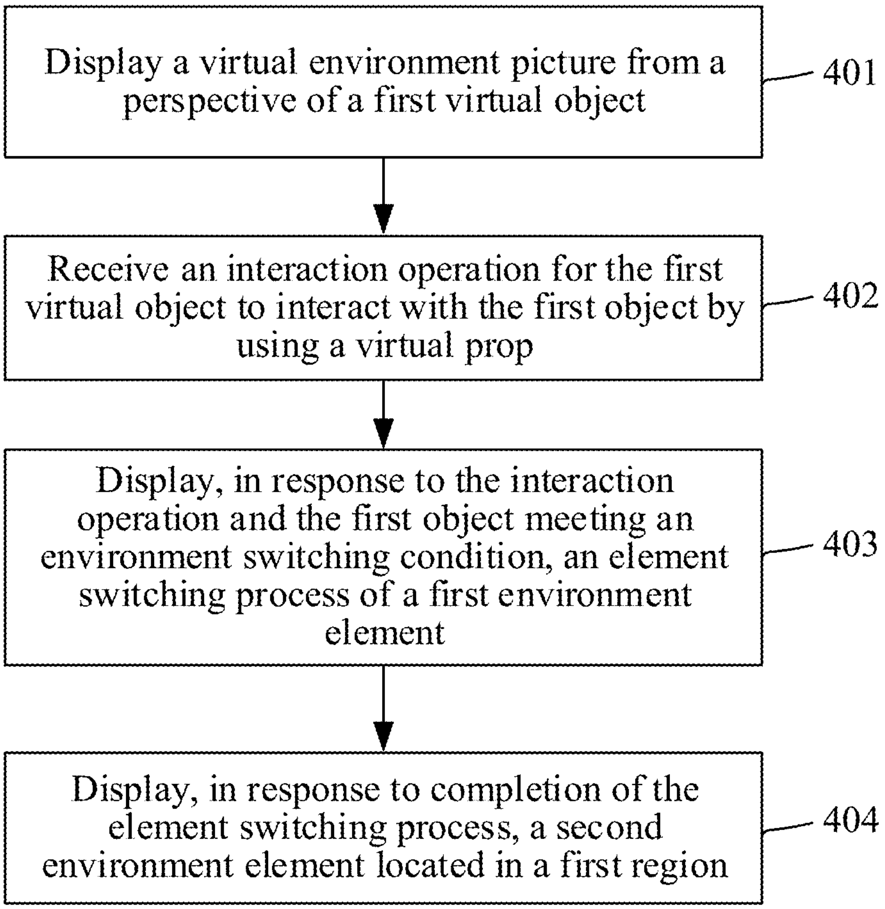
FIG. 4 is a flow chart of picture display in a virtual environment according to an exemplary embodiment of this application.

FIG. 4 shows a flow chart of picture display in a virtual environment according to an exemplary embodiment of this application. This embodiment uses an example in which the method is applied to the terminal 310 in the implementation environment shown in FIG. 3 or other terminals in the implementation environment in descriptions. The method includes the following steps:

Step 401: Display a virtual environment picture from a perspective of a first virtual object.

The first virtual object is equipped with a virtual prop. The virtual environment includes a first object. The first object is used for triggering environment switching for a first region in the virtual environment. The first region includes a first environment element.

In some embodiments, a server obtains the virtual environment picture by extracting a single picture from the virtual environment. The terminal displays the virtual environment picture, and displays various elements configured in the virtual environment, such as sky, land, trees, houses, rivers and other environment elements.

In some embodiments, the virtual environment picture displayed by the terminal may be a picture obtained by observing the virtual environment from a first-person perspective of the first virtual object, or the virtual environment picture displayed by the terminal may also be a picture obtained by observing the virtual environment from a third-person perspective of the first virtual object. The first user can control the first virtual object in the virtual environment through the terminal, and realize various activities in the virtual environment through the virtual object.

The virtual environment includes the first object, and the first region exists in the virtual environment. The function of the first object is to perform environment switching on the first region, that is, to switch the environment elements in the first region. In some embodiments, a certain range of the position of the first object is taken as the first region; or, there may be a plurality of first objects in a virtual environment, and any one of the first objects can perform environment switching on the same first region in the virtual environment; or, there may be a plurality of first regions and a plurality of first objects in a virtual environment, and each first object correspondingly performs environment switching on a first region, which is not limited here.

Step 402: Receive an interaction operation for the first virtual object to interact with the first object by using a virtual prop.

The interaction operation is used for triggering an environment switching function of the first object, and the environment switching function refers to a function of performing environment switching on the first region in the virtual environment. Exemplarily, the interaction operation refers to an operation for controlling the first virtual object to interact with the first object by using a virtual prop.

In some embodiments, the interaction operation includes at least one of the following operations:

1. The first object is configured with a trigger switch, and when a pressing operation on the trigger switch from the terminal is received, the environment switching function of the first object is triggered.
2. The first user controls the first virtual object to use the first object to complete a designated task, and triggers the environment switching function of the first object.
3. The first user performs an attack operation on the first object by controlling the first virtual object, and triggers the environment switching function of the first object.
4. The first user moves the position of the first object by controlling the first virtual object, and when the position of the first object (for example, within the first region or where the environment switching function can be triggered for the specified first region) meets an environment switching condition, triggers the environment switching function of the first object. Exemplarily, the environment switching condition may include that the first object moves to a specified position, and the specified position is a position in the first region where the environment switching function is triggered.
5. The first object has a mode configuration function based on the first region, and the first user performs mode configuration on the first object by controlling the first virtual object, and triggers the environment switching function of the first object when the first region meets the environment switching condition. Exemplarily, the environment switching condition may include a trigger condition for the environment switching function obtained by the model configuration.
6. The server sets a duration threshold for the first object, and triggers the environment switching function of the first object when a display duration of the first object reaches the duration threshold.
7. The server sets a duration threshold for the first object. The first user moves the first object by controlling the first virtual object to so that the first object is at a certain position, and uses the position of the first object as the origin and a specified range as the first region to trigger the environment switching function of the first object to the first region when a display duration of the first object at the certain position reaches or exceeds the duration threshold.

The environment switching condition refers to a condition needing to be met to trigger the environment switching in the first region.

The above-mentioned interaction operation manners are merely illustrative examples, and the specific interaction operation manners are not specifically limited in the embodiments of this application.

Step 403: Display, in response to the interaction operation and the first object meeting the environment switching condition, an element switching process of the first environment element.

The element switching process is a process of switching the first environment element to a second environment element.

When the environment switching function is triggered, the process of element switching from the first environment element to the second environment element is displayed, and the process of element switching is displayed in a pulse switching mode.

The pulse switching mode is a display mode in which energy pulses appear from an origin and diffuse outward, and the first environment element is switched during diffusion. The energy pulses may appear with the first object as the origin and diffuse outward, or the energy pulses may appear with the position of the first virtual object as the origin and diffuses outward, which is not limited here.

Figure 5:
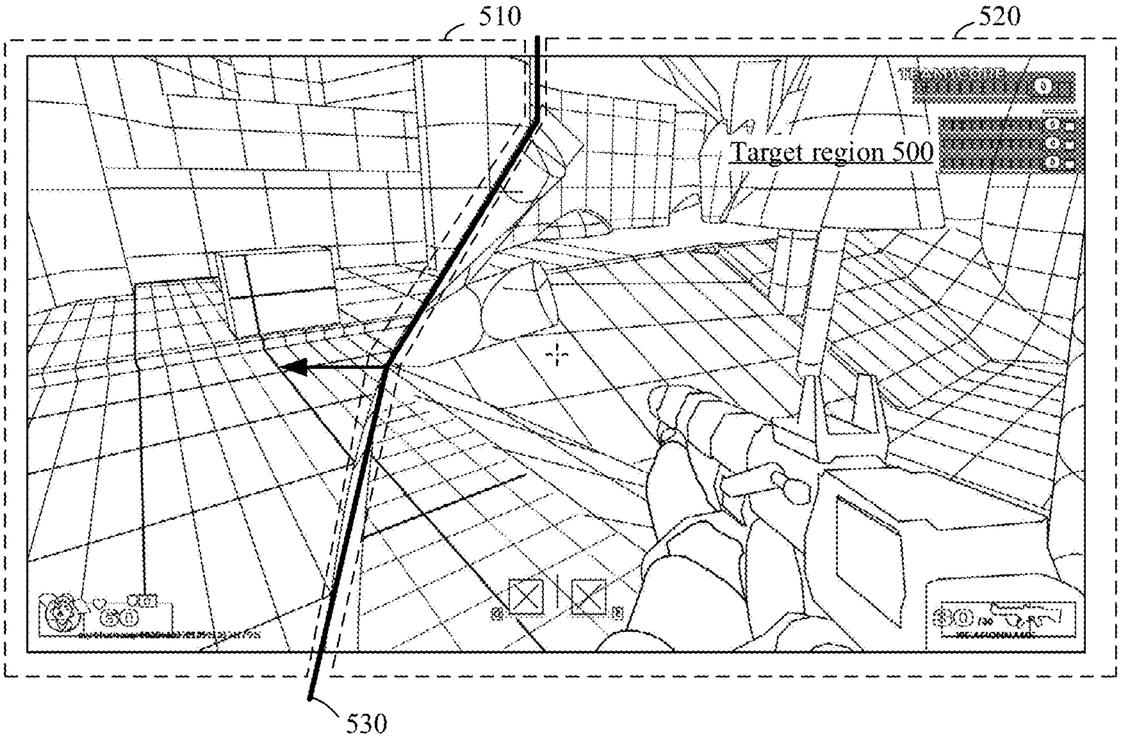
FIG. 5 is a schematic diagram of an element switching process according to an exemplary embodiment of this application.

The display element switching process is an element switching process of displaying the first environment element in the pulse switching mode. Schematically, referring to FIG. 5, FIG. 5 shows a schematic diagram of an element switching process according to an exemplary embodiment of this application. As shown in FIG. 5, FIG. 5 is the first region 500 in the virtual environment picture, which includes a virtual environment 510 containing the first environment element and a virtual environment 520 containing the second environment element during the element switching process. The element switching process is that: when spreading to the virtual environment 510 containing the first environment element, a pulse layer 530 may switch the virtual environment 510 containing the first environment element to the virtual environment 520 containing the second environment element.

In some embodiments, the element switching process is a process of displaying or disappearing slices of a three-dimensional model corresponding to the element, i.e., obtaining a first model of the first environment element, the first model being a three-dimensional model of the first environment element; obtaining a second model of the second environment element, the second model being a three-dimensional model of the second environment element; slicing the first model to obtain n first slice models, n being a positive integer; and slicing the second model to obtain m second slice models, m being a positive integer.

In some embodiments, the slicing manner includes either of the following manners:

1. setting a fixed number of slices, that is, n=m, and slicing the first model and the second model respectively according to the number of slices, to obtain the same number of first slice models and second slice models; and
2. setting a fixed slice length, and slicing the first model and the second model respectively according to the slice length, to obtain first slice models and second slice models with the same slice length.

The above-mentioned slicing manners are merely illustrative examples, and the specific slicing manners are not specifically limited in the embodiments of this application.

The first slice models and the second slice models are switched based on the pulse switching mode to obtain the switching process of the first environment element. In the pulse switching mode, first-layer pulses and second-layer pulses are included, and display of the n first slice models is canceled slice by slice in the first-layer pulses. The m second slice models are displayed slice by slice in the second-layer pulses based on disappearance of the first slice models to obtain the element switching process of the first environment element.

Figure 6:
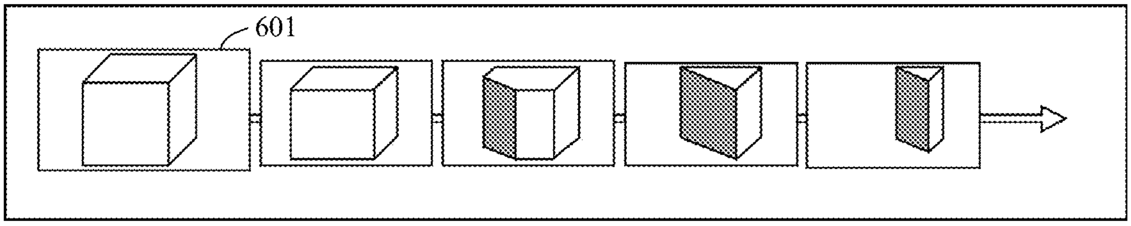
FIG. 6 is a schematic diagram of a slice model according to an exemplary embodiment of this application.

Schematically, referring to FIG. 6, FIG. 6 shows a schematic diagram of a slice model according to an exemplary embodiment of this application. As shown in FIG. 6, a first model 601 of the first environment element disappears in the form of slices. By continuously cutting the first model 601 in the form of slices, the first model 601 disappears slice by slice. Similarly, a second model of the second environment element is displayed in the form of slices, and the second model is displayed slice by slice by continuously increasing the second model in the form of slices.

Step 404: Display, in response to completion of the element switching process, the second environment element located in the first region.

In some embodiments, when the element switching process is completed, display of the first object may be canceled in the virtual environment, or the first object may further include at least one of the following functions:

1. When the element switching process is completed, additional material rewards or equipment rewards are generated for the virtual object to use.
2. When the element switching process is completed, the first object becomes an offensive prop with an interference effect or damage performance for the virtual object to use.
3. When the element switching process is completed, the first object is reset, and when the first object meets the environment switching condition again, environment switching is performed on the first region again, and the first object has the function of performing multiple cyclic switching on the first region.

The functions of the first object above are merely illustrative examples, and the specific functions of the first object are not limited in the embodiments of this application.

In some embodiments, the element switching process may only occur once in a single game; or may occur multiple times. The same first object may perform environment switching on a single first region multiple times; alternatively, it is also possible that the same first object performs environment switching on a plurality of first regions once or multiple times.

The above-mentioned method can be applied to any of various games such as an FPS game, a TPS game, and a MOBA game. Taking a capture-the-flag mode in the game as an example, in the capture-the-flag mode, there are a plurality of camps having a hostile relationship (here a first camp and a second camp are taken as examples for illustration). The first camp includes a first virtual object, and the second camp includes a second virtual object. The first virtual object and the second virtual object need to fight for a flag in the game to win the victory of the game battle. In a process of fighting for the flag, taking the first virtual object as an example, the first virtual object can interact with the first object in the virtual environment by using the virtual prop according to the interaction operation, to trigger the environment switching of the first region in the virtual environment, so that the position or quantity of the flag is changed accordingly, which is not limited here.

In conclusion, the embodiment of this application provides a virtual picture display method, where a virtual environment picture including a first region is displayed from a perspective of a first virtual object, the first region including a first environment element; the first environment element is switched to a second environment element through an interaction operation during interaction of the first virtual object with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 7:
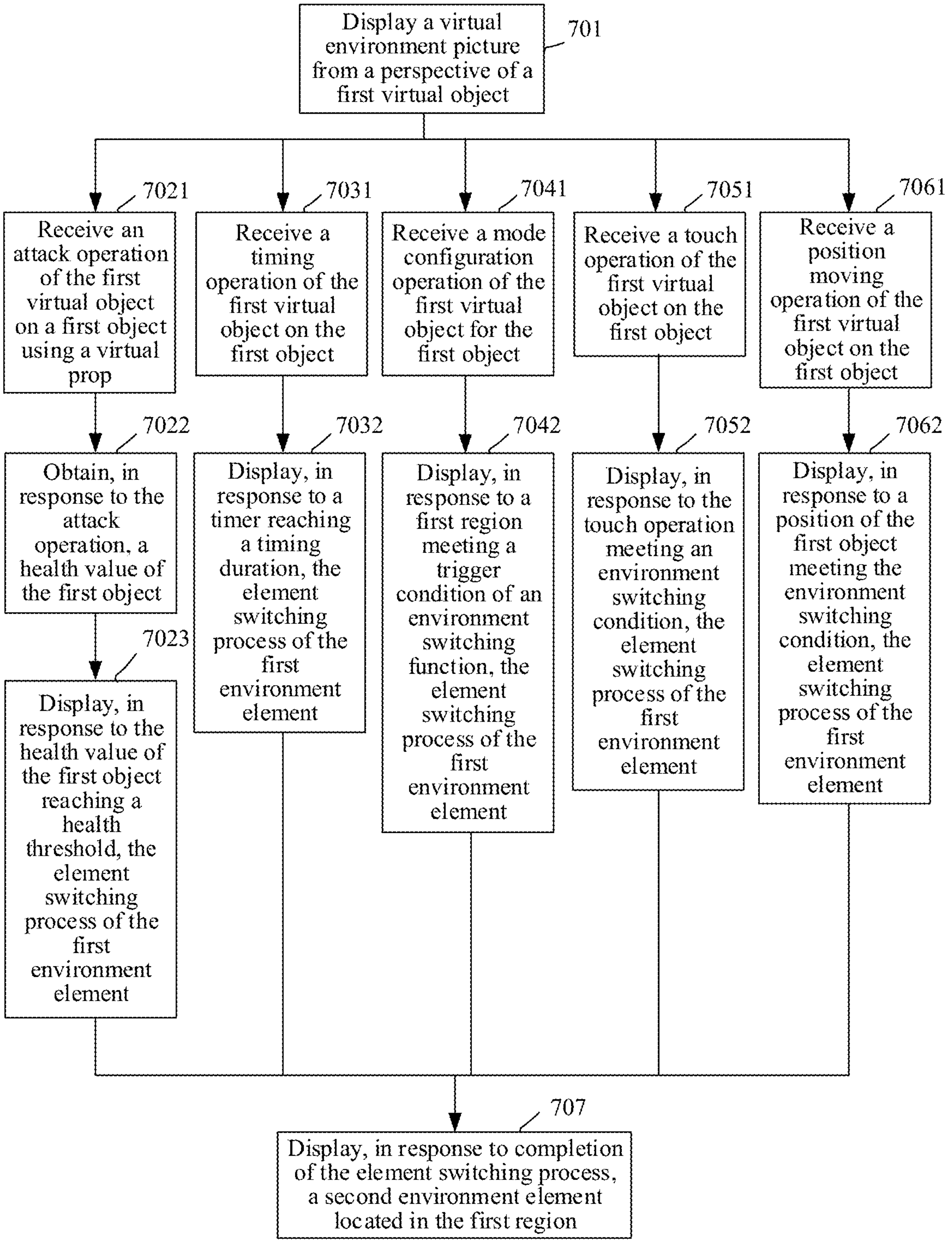
FIG. 7 is a flow chart of picture display in a virtual environment according to another exemplary embodiment of this application.

In some embodiments, the interaction operation includes an attack operation, a timing operation, a mode configuration operation, a touch operation, and a position moving operation. Schematically, referring to FIG. 7, FIG. 7 shows a flow chart of picture display in a virtual environment according to an exemplary embodiment of this application. The method includes the following steps:

Step 701: Display a virtual environment picture from a perspective of a first virtual object.

The first virtual object is equipped with a virtual prop. The virtual environment includes a first object. The first object is used for triggering environment switching for a first region in the virtual environment. The first region includes a first environment element.

Schematically, the first region may be an entire virtual environment; or, may also be part of a designated region in the virtual environment. The designated region may be a region designated by a server; or, may be a region that a user controls the virtual object to select, which is not limited here.

The interaction operation in this embodiment includes an attack operation, a timing operation, a mode configuration operation, a touch operation, and a position moving operation. The attack operation includes step 7021 to step 7023, the timing operation includes step 7031 to step 7032, the mode configuration operation includes step 7041 to step 7042, the touch operation includes step 7051 to step 7052, and the position moving operation includes step 7061 to step 7062.

Step 7021: Receive an attack operation of the first virtual object on the first object using a virtual prop.

Schematically, the specific implementation manner of the attack operation includes at least one of the following manners:

1. By controlling the first virtual object, a first user can use all virtual props with attack performance to perform the attack operation on the first object, such as: firearms, throwing type virtual props, and fists.
2. By controlling the first virtual object, the first user can performs the attack operation on the first object by equipping or picking up a specified virtual prop in the virtual environment in advance, where the specified virtual prop is a virtual prop preset to perform the attack operation on the first object.
3. The first user purchases a virtual prop by charging money to perform the attack operation on the first object.

The specific implementation manners of the attack operation are merely schematic examples, and the specific implementation manners of the attack operation are not limited in the embodiments of this application.

Schematically, the virtual environment includes only the first virtual object to perform the attack operation on the first object; or may include a plurality of virtual objects to perform the attack operation on the first object, which is not limited here.

Step 7022: Obtain, in response to the attack operation, a health value of the first object.

The health value of the first object changes under the influence of the attack operation.

In some embodiments, the health value of the first object may decrease or increase under the influence of the attack operation.

When the health value of the first object is changed by the attack operation, that is, the first user attacks the first object by controlling the first virtual object, in some embodiments, the first virtual object can use all virtual props with attack performance, such as: firearms, throwing type virtual props, and fists, to attack the first object to cause the health value of the first object to change, thereby triggering the environment switching function of the first object. Alternatively, the first virtual object can also use a specified virtual prop to attack the first object to change the health value of the first object, thereby triggering the environment switching function of the first object, that is, receiving an attack operation of the specified virtual prop on the first object, where the specified virtual prop is used for changing the health value of the first object. Schematically, the change in the health value caused by each attack of the virtual prop on the first object is the same; or may be different, for example, the health value of the first object changes at a uniform speed, or changes at a non-uniform speed. When the environment switching function of the first object is triggered, it may be triggered immediately, or be triggered non-immediately (that is, the environment switching function can be triggered only after waiting for a certain period of time), which is not limited here.

Step 7023: Display, in response to the health value of the first object reaching a health threshold, an element switching process of a first environment element.

In some embodiments, the first object meeting an environment switching condition includes: when the health value of the first object is 0 based on the attack operation, displaying an element switching process of the first environment element; or setting a first health threshold by a server, and when the virtual prop performs an attack operation on the first object so that the first object reaches or falls below the first health threshold, displaying the element switching process of the first environment element, or under a condition that an initial health value of the first object is 0, setting a second health threshold by the server, and when the virtual prop performs an attack operation on the first object so that the health value of the first object reaches or exceeds the second health threshold, displaying the switching process of the first environment element, that is, displaying, in response to the health value of the first object reaching the health threshold, the element switching process of the first environment element.

Figure 8:
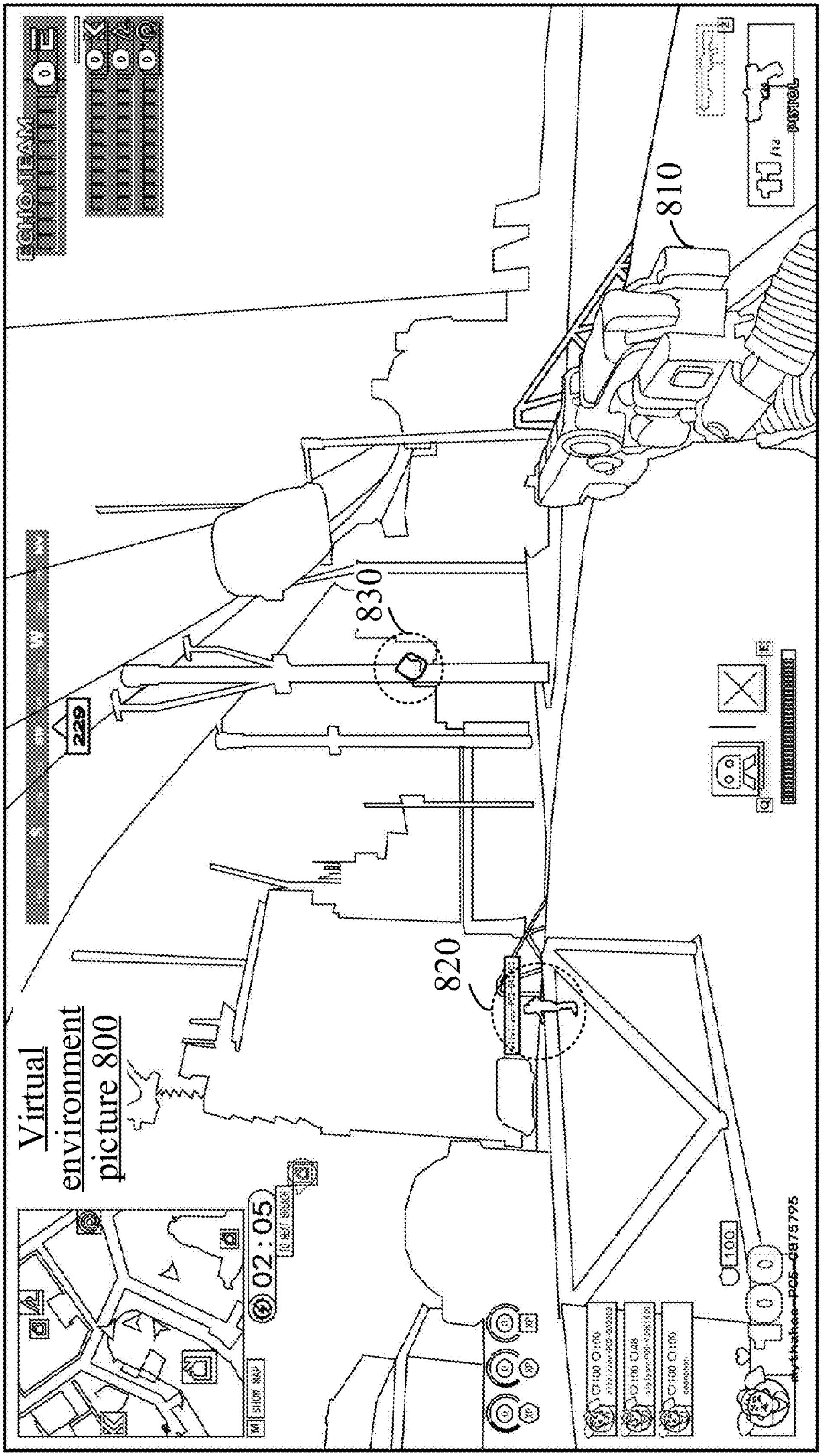
FIG. 8 is a schematic diagram of receiving an attack operation on a first object according to an exemplary embodiment of this application.

Schematically, referring to FIG. 8, FIG. 8 is a schematic diagram of receiving an attack operation on a first object according to an exemplary embodiment of this application. As shown in FIG. 8, FIG. 8 is a virtual environment picture from a perspective of a first virtual object. A virtual environment 800 includes a first virtual object 810, a second virtual object 820, and a first object 830. The first object 830 corresponds to a health value. The first virtual object 810 and the second virtual object 820 have a hostile relationship, or the first virtual object 810 and the second virtual object 820 are in the same camp. The first virtual object 810 and the second virtual object 820 both perform an attack operation on the first object 830, and respectively trigger corresponding environment switching functions.

The first virtual object 810 performs a first attack operation on the first object 830, and when the first object 830 reaches a health threshold, a first element switching process is displayed. The second virtual object 820 performs a second attack operation on the first object 830, and when the first object 830 reaches a health threshold, a second element switching process is displayed.

When both the first virtual object 810 and the second virtual object 820 perform an attack operation on the first object 830, if the first attack operation of the first virtual object 810 makes the first object 830 reach the health threshold, the environment switching function of the first object 830 is triggered, and the first element switching process corresponding to the first virtual object 810 is displayed. If the second attack operation of the second virtual object 820 makes the first object 830 reach the health threshold, the environment switching function of the first object 830 is triggered, and the second element switching process corresponding to the second virtual object 820 is displayed, that is, in response to the health value of the first object reaching the health threshold through the first attack operation, the first element switching process of the first environment element is displayed. In response to the health value of the first object reaching the health threshold through the second attack operation, the second element switching process of the first environment element is displayed.

Schematically, displaying the first element switching process includes displaying the element switching process of the first environment element and an interference special effect, and the interference special effect only interferes with virtual objects other than the first virtual object, or displaying the first element switching process includes displaying the element switching process of the first environment element and displaying the first virtual object in a protected mode, that is, during the first element switching process, making the first virtual object immune to other attack operations and displaying same in the protected mode, which is not limited here. Similarly, the display method of the second element switching process can be obtained. For example, the second element switching process also includes displaying the element switching process of the first environment element and an interference special effect, and the interference special effect in the second element switching process only interferes with virtual objects other than the second virtual object, or displaying the first element switching process includes displaying the switching process of the first environment element and displaying the second virtual object in a protected mode, that is, during the first element switching process, making the second virtual object immune to other attack operations and displaying same in the protected mode.

Exemplarily, the first element switching process and the second element switching process may also be different element switching processes. For example, the first element switching process may be a process of switching from the first environment element to the second environment element, and the second element switching process may be a process of switching from the first environment element to a third environment element. For another example, the first element switching process is a process of switching the first environment element to the second environment element by using a first special effect, the second element switching process is a process of switching the first environment element to the second environment element by using a second special effect, and the first special effect and the second special effect are different display special effects during element switching.

Step 7031: Receive a timing operation of the first virtual object on the first object.

The timing operation is used for triggering the environment switching function of the first object through a timer.

In some embodiments, the timing operation includes at least one of the following manners:

1. The first user performs a press operation on the first object through a terminal, thereby starting the timer, for triggering the environment switching function of the first object.
2. The first user sets a duration threshold for the first object, and enables a timing function of the timer, for triggering the environment switching function of the first object, that is, the first user may adjust the triggering time of the environment switching function by using the timer.

The above-mentioned specific manners of the timing operation are merely schematic examples, and the specific manners of the timing operation are not limited in this application.

Step 7032: Display, in response to the timer reaching the timing duration, the element switching process of the first environment element.

The first user controls the first virtual object to perform time allocation through the timer, and sets the time to trigger the environment switching function, that is, the time to trigger the environment switching function can be allocated by the virtual object.

In some embodiments, the specific implementation manner of the environment switching function based on the timing operation includes at least one of the following manners:

1. The first user sets a first duration threshold through the timer, and when the duration of the received timing operation on the first object reaches the first duration threshold, the environment switching function of the first object is triggered.
2. The first user sets a second duration threshold through the timer; timing is started after the first object receives a first timing operation, and when the duration of the first timing operation reaches the second duration threshold, an environment switching function is triggered; timing is restarted after the display of the environment switching function is completed, and then the environment switching function of the first object is triggered every time the second duration threshold is reached, to perform a cyclic timing trigger process.

The above-mentioned specific manners of the environment switching function based on the timing operation are merely schematic examples, and the specific implementation manners of the environment switching function based on the timing operation are not limited in this application.

Schematically, in response to the timer reaching the timing duration, the terminal displays corresponding timing completion special effects, including sound special effects or display special effects (such as smoke and flash).

Step 7041: Receive a mode configuration operation of the first virtual object for the first object.

The mode configuration operation is used for configuring a trigger condition of the environment switching function.

In some embodiments, the first user can perform model configuration on the first object by controlling the first virtual object, including configuring the trigger time, trigger environment requirement, trigger object requirement, and switching range of the environment switching function, etc. The trigger time refers to a duration from receiving the mode configuration operation for the first object to triggering the environment switching function of the first object. The trigger environment requirement refers to an environmental condition that needs to be met to trigger the environment switching function of the first object. The trigger object requirement refers to a relevant condition of the virtual object that satisfies the condition for triggering environment switching.

Step 7042: Display, in response to the first region meeting the trigger condition of the environment switching function, the element switching process of the first environment element.

In some embodiments, the specific implementation manner of mode configuration includes at least one of the following manners:

1. The first user performs model configuration on the first object by controlling the first virtual object, and when any other virtual object having a hostile relationship enters the first region, the environment switching function of the first object is triggered, and the element switching process of the first environment element is displayed.
2. The first user inputs identity information or character information of a specified virtual object to the first object by controlling the first virtual object, and when a virtual object conforming to the identity information or character information enters the first region, the environment switching function of the first object is triggered, and the element switching process of the first environment element is displayed.
3. The first user sets a quantity threshold for the first object by controlling the first virtual object, and when a quantity of virtual objects in the first region reaches or exceeds the quantity threshold, the environment switching function of the first object is triggered, and the element switching process of the first environment element is displayed.
4. The first user sets an event threshold for the first object by controlling the first virtual object, and when the number of attack events occurring in the first region reaches or exceeds the event threshold, the environment switching function of the first object is triggered, and the element switching process of the first environment element is displayed.

5. The server sets a duration threshold, the first user performs mode configuration on the first object by controlling the first virtual object, and when durations of other virtual objects reaching the first region meet the duration threshold, the environment switching function of the first object is triggered, and the element switching process of the first environment element is displayed.

The above-mentioned specific implementation manners of the mode configuration are merely schematic examples, and the specific implementation manners of the mode configuration are not limited in this application.

Step 7051: Receive a touch operation of the first virtual object on the first object.

The touch operation is used for controlling the first virtual object to touch the first object.

In some embodiments, the touch operation includes at least one of the following manners:

1. The first object is configured with a trigger control, and when the server receives a press operation of the terminal on the trigger control, the environment switching function of the first object is triggered.
2. The server sets a specified number of press operations, and when the first user completes the specified number of press operations, the environment switching function of the first object is triggered.
3. The first object is configured with a trigger control, the server sets a press duration threshold, and when the server receives the press operation of the terminal on the trigger control and the press duration reaches or exceeds the press duration threshold, the environment switching function of the first object is triggered.

The above-mentioned specific implementation manners of the touch operation are merely schematic examples, and the specific implementation manners of the touch operation are not limited in this application.

Step 7052: Display, in response to the touch operation meeting the environment switching condition, the element switching process of the first environment element.

When the first user completes a specified touch operation and the touch operation meets the environment switching condition, the element switching process of the first environment element is displayed.

Step 7061: Receive a position moving operation of the first virtual object on the first object.

The position moving operation is used for changing a position of the first object in the virtual environment by controlling the first virtual object to move the first object.

In some embodiments, the first object performs environment switching on a specified first region. The first user changes the position of the first object by moving the first object, and the first object is moved into the specified first region, to trigger the environment switching function of the first object to the specified first region; alternatively, the first object is moved to a specified position outside the first region, to trigger the environment switching function of the first object to the specified first region, which is not limited here.

Step 7062: Display, in response to the position of the first object meeting the environment switching condition, the element switching process of the first environment element.

When the first object is located in the specified first region or at the specified position outside the first region, the switching process of the first environment element is displayed.

In some embodiments, the first region further includes mark elements, and the mark elements are elements that need to keep element mark display during the element switching process.

In some embodiments, the mark elements may be of an element type that is present in both the first environment element and the second environment element, such as: trees and lawns, or may be elements that can represent characteristics of the current virtual environment among first environment elements, which is not limited here.

The selection manner of mark elements may include at least one of the following manners:

1. The server selects the mark elements that need to be displayed during the element switching process.
2. The first user voluntarily selects, by controlling the first virtual object, the mark elements that need to be displayed during the element switching process.

The above-mentioned selection manners of the mark elements are merely illustrative examples, and the selection manners of the mark elements are not limited in the embodiments of this application.

Figure 9:
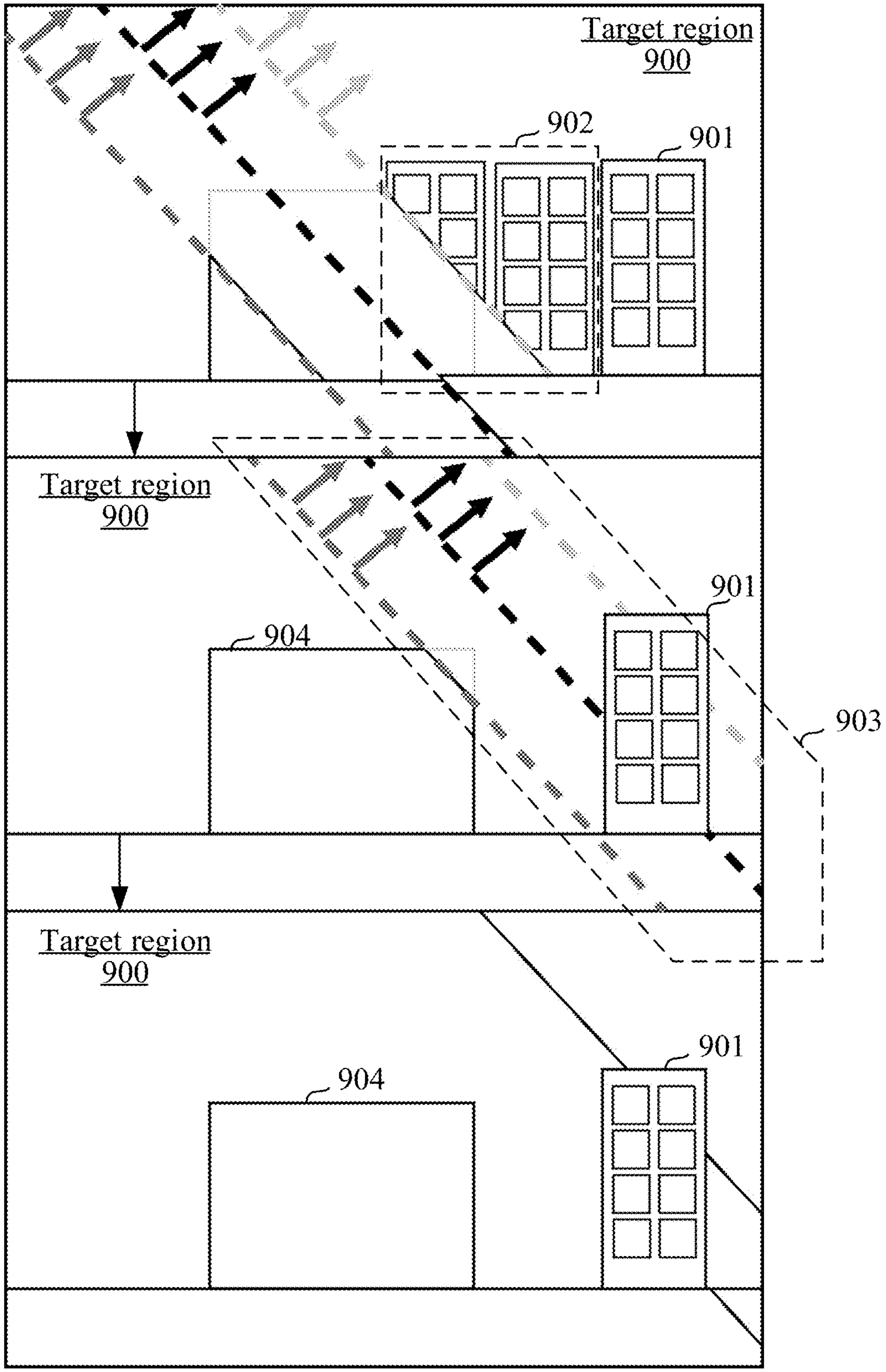
FIG. 9 is a schematic diagram of a process of retaining a marked element according to an exemplary embodiment of this application.

Schematically, referring to FIG. 9, FIG. 9 shows a schematic diagram of a process of retaining a marked element according to an exemplary embodiment of this application. As shown in FIG. 9, a first region 900 includes a mark element 901 and a first environment element 902 before an element switching process is completed. When the switching process of the first environment element 902 is displayed in a pulse switching mode, pulses 903 switch the first environment element 902 to a second environment element 904 and retain the mark element 901. Finally, the mark element 901 and the second environment element 904 are retained in the first region 900.

Step 707: Display, in response to completion of the element switching process, the second environment element located in the first region.

The process of this step is similar to that of step 404, and details are not described herein again.

In conclusion, the embodiment of this application provides a virtual picture display method, where a virtual environment picture including a first region is displayed from a perspective of a first virtual object, the first region including a first environment element; the first environment element is switched to a second environment element through an interaction operation for the first virtual object to interact with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 10:
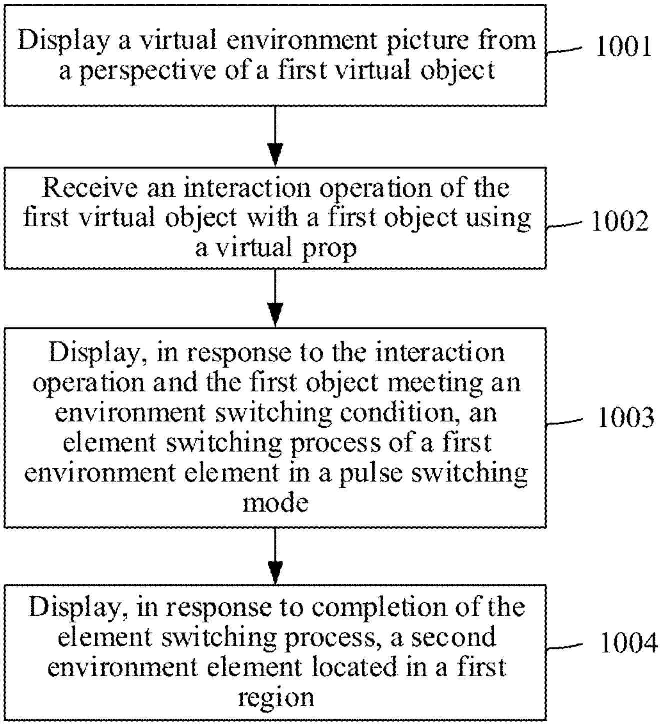
FIG. 10 is a flow chart of picture display in a virtual environment according to another exemplary embodiment of this application.

In some embodiments, displaying the element switching process of the first environment element in the pulse switching mode involves three layers of pulses. Please refer to FIG. 10 for details. FIG. 10 shows a flow chart of picture display in a virtual environment according to an exemplary embodiment of this application.

Step 1001: Display a virtual environment picture from a perspective of a first virtual object.

The first virtual object is equipped with a virtual prop. The virtual environment includes a first object. The first object is used for triggering environment switching for a first region in the virtual environment. The first region includes a first environment element.

Step 1002: Receive an interaction operation of the first virtual object with the first object using a virtual prop.

The interaction operation is used for triggering an environment switching function of the first object.

The process of step 1001 to step 1002 is similar to that of step 401 to step 402, and details are not described herein again.

Step 1003: Display, in response to the interaction operation and the first object meeting an environment switching condition, an element switching process of the first environment element in a pulse switching mode.

The element switching process is a process of switching the first environment element to a second environment element.

In some embodiments, the pulse switching mode further includes first-layer pulses, second-layer pulses and third-layer pulses, and the first region includes terrain elements and object elements.

Switching first slice models and second slice models based on the pulse switching mode to obtain the element switching process of the first environment element includes: canceling display of the first slice models corresponding to the object elements slice by slice in the first-layer pulses; canceling display of the first slice models corresponding to the terrain elements slice by slice in the second-layer pulses; and displaying the second slice models slice by slice in the third-layer pulses based on disappearance of the first slice models to obtain the element switching process of the first environment element.

When the three layers of pulses diffuse outward from the origin, the speeds of the pulses may be the same, that is, the pulse switching mode is displayed as a uniform switching process; or, the speeds of the pulses may also be different, and the speeds of the three layers of pulses may be faster and faster; or, it is also possible that the speeds of the three layers of pulses become slower and slower, which is not limited here.

Figure 11:
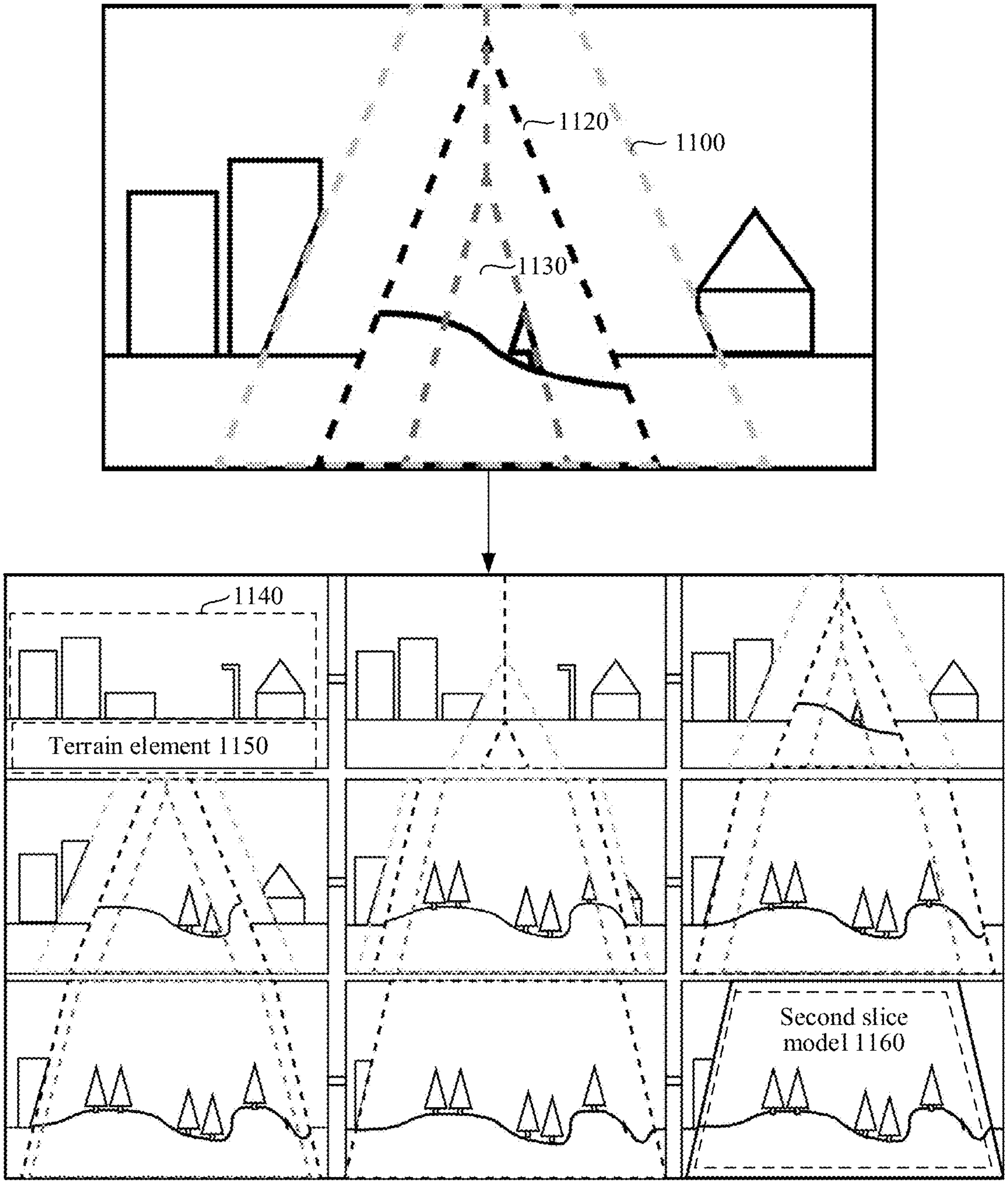
FIG. 11 is a schematic diagram of an element switching process according to an exemplary embodiment of this application.

Schematically, referring to FIG. 11, FIG. 11 shows a schematic diagram of an element switching process according to an exemplary embodiment of this application. As shown in FIG. 11, the pulse switching mode includes three layers of pulses, i.e., first-layer pulses 1100, second-layer pulses 1120, and third-layer pulses 1130. In the first-layer pulses 1100, first slice models corresponding to object elements 1140 disappear slice by slice, where the object elements include buildings, trees, etc.; in the second-layer pulses 1120, the first slice models corresponding to terrain elements 1150 disappear slice by slice, where the terrain elements include grasslands, rivers, mountains, etc.; and In the third-layer pulses 1130, second slice models 1160 are displayed slice by slice, where the second slice models include terrain elements and object elements.

When the pulses diffuse outward from the origin, at least one of the following situations may occur:

1. Each layer of pulses starts from the same origin, and in the process of diffusing outward, when the pulses touch an edge of a first region, the pulses are displayed in a disappearing mode.
2. The first-layer pulses starts from the origin, and in the process of diffusing outward, when the pulses touch the edge of the first region, the pulses are displayed in a bounce mode as the second-layer pulses which gather toward the origin; when the second-layer pulses gather at the origin and spread outward from the origin, that is, the third-layer pulses start to perform pulse switching mode, and when the third-layer pulses reach the edge of the first region, the pulses disappear.
3. The pulses start from the origin, and in the process of diffusing outward, when the pulses touch the edge of the first region, the pulses diffuse out of the first region in other special effect display modes, such as: smoke special effects, luminous specific effects, etc., causing certain interference to virtual objects within a certain range outside the first region, and the interference effect will last for a period of time.

The above-mentioned display manners of the pulse switching mode are merely exemplary examples, and the specific display manners of the pulse switching mode are not limited in the embodiments of this application.

A first pulse interval is included between the first-layer pulses and the second-layer pulses. A second pulse interval is included between the second-layer pulses and the third-layer pulses. In some embodiments, the interval time between the first pulse interval and the second pulse interval may be the same; or may also be different, which is not limited here.

Step 1004: Display, in response to completion of the element switching process, the second environment element located in the first region.

After the element switching process is completed, the second environment element and the mark element in the first region are displayed.

In conclusion, the embodiment of this application provides a virtual picture display method, where a virtual environment picture including a first region is displayed from a perspective of a first virtual object, the first region including a first environment element; the first environment element switched to a second environment element through an interaction operation of the first virtual object with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 12:
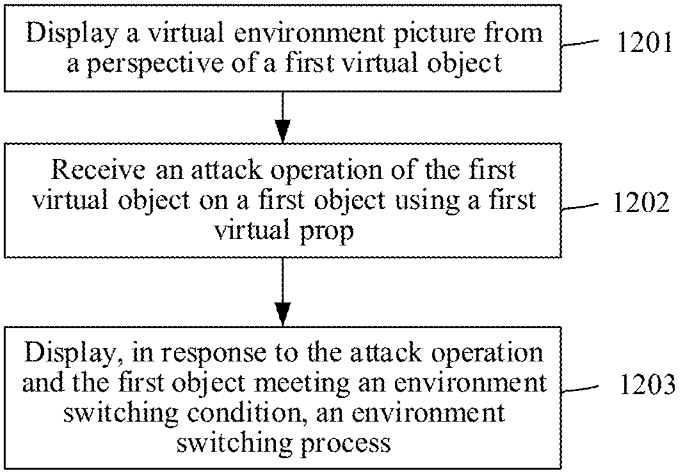
FIG. 12 is a flow chart of picture display in a virtual environment according to another exemplary embodiment of this application.

In some embodiments, the virtual environment further includes an enhancing prop. Referring to FIG. 12, FIG. 12 shows a flow chart of a virtual picture display method according to an exemplary embodiment of this application. The method includes the following steps:

Step 1201: Display a virtual environment picture from a perspective of a first virtual object.

The first virtual object is equipped with a first virtual prop. The virtual environment includes a first object. The first object is used for triggering environment switching for a first region in the virtual environment.

In some embodiments, taking a capture-the-flag mode as an example, in the capture-the-flag mode, the virtual environment includes a plurality of camps having a hostile relationship (here a first camp and a second camp are taken as examples for illustration). The first camp includes a first virtual object, and the second camp includes a second virtual object. The first virtual object is equipped with a first virtual prop, and the second virtual object is equipped with a second virtual prop. The first virtual prop and the second virtual prop may be the same virtual prop, or may be different types of virtual props, which are not limited here. The virtual environment includes k enhancing props (here the enhancing props being flags are taken as an example for illustration). The first virtual object and the second virtual object need to win the game by fighting for flags. The virtual object obtaining more flags achieves a battle victory, or the virtual object obtaining a target number of flags achieves the battle victory. That is, the virtual environment includes k enhancing props, the number of the enhancing props is used for determining the battle victory, and k is a positive integer. In response to the number of enhancing props obtained by the first virtual object being greater than the number of enhancing props obtained by the second virtual object, it is determined that the first virtual object achieves a battle victory. In the virtual environment, positions of the flags may be fixedly distributed, or may also be randomly distributed, which are not limited here.

Step 1202: Receive an attack operation of the first virtual object on the first object using a first virtual prop.

The attack operation is used for triggering an environment switching function of the first object. The first object may include virtual props used for environment switching, which may also be called environment switching props.

In some embodiments, taking a capture-the-flag mode as an example, the first object corresponds to a health value and the health value of the first object changes under the influence of the attack operation.

The display form of the first object may include at least one of the following manners:

1. During a game battle process, the first object is displayed in the virtual environment in a prop display mode.
2. During a game battle process, taking the first virtual object as an example, when the first virtual object completes a specified task, the first object is displayed in the virtual environment in a prop display mode.
3. The server sets a progress threshold for a game battle, and when a display duration of the game battle reaches or exceeds the progress threshold, the first object is displayed in a display mode.

The above-mentioned display forms of the first object are merely illustrative examples, and the display forms of the first object are not limited in the embodiments of this application.

Step 1203: Display, in response to the attack operation and the first object meeting an environment switching condition, an environment switching process.

In a capture-the-flag mode, when the first virtual object is attacked or encounters an obstacle element during the course of action, the first virtual object uses the first virtual prop to attack the first object, for triggering the environment switching function of the first object. When the environment switching function is triggered, interference special effects may appear around the first virtual object, which are used for interfering with other virtual objects in the virtual environment, but have no interference effect on the first virtual object; or there may be obstacles around the first virtual object, which are used for creating obstacles to other virtual objects in the virtual environment during the attack process; or the obstacle elements during the course of action of the first virtual object are displayed in a disappearing mode, which is not limited here.

When a health value of the first object reaches a health threshold, the environment switching function of the first object is triggered, and the environment switching process is displayed. During the environment switching process, flags in the first region may be changed in position in the first region with the environment switching process; or, the virtual environment includes a plurality of first regions, and flags in a first region may be changed to other different first regions with the environment switching process, which is not limited here.

After display of the environment switching process is completed, the flags may include at least one of the following several change forms in the virtual environment:

1. The flags are displayed in a display mode when the display of the environment switching process is completed; taking the first virtual object as an example, the first virtual object can perform an attack operation on the first object, and the health value of the first object reaches the health threshold; the environment switching function of the first object is triggered, and the environment switching process in the first region is displayed; when the display of the environment switching process is completed, the flags appear in the first region or at a specified position inside or outside the first region in the display mode.
2. The flags are changed in distribution position when the display of the environment switching process is completed; taking the first virtual object as an example, when there is no flag in the first region, the first virtual object performs an attack operation on the first object, and the health value of the first object reaches the health threshold; the environment switching function of the first object is triggered, and the environment switching process in the first region is displayed; when the display of the environment switching process is completed, the flags are changed in distribution position so as to appear in the first region or at a specified position outside the first region in the display mode.
3. The flags are displayed in a collection mode when the display of the environment switching process is completed; taking the first virtual object as an example, when there are scattered flags distributed in the first region, and when the first virtual object performs an attack operation on the first object, and the health value of the first object reaches the health threshold, the environment switching function of the first object is triggered, and the environment switching process in the first region is displayed; when the display of the environment switching process is completed, the flags in the first region are displayed in the collection mode.

The above-mentioned existence forms of the flags are merely illustrative examples, and the existence forms are not limited in the embodiments of this application.

The foregoing description about the capture-the-flag mode is merely a schematic example. In some embodiments, in the capture-the-flag mode, there may be a situation where there is only one flag. In the capture-the-flag mode, the virtual environment includes one flag and has a plurality of hostile camps (a first camp and a second camp are taken as examples here). The first camp includes a first virtual object, and the second camp includes a second virtual object. The first virtual object and the second virtual object achieve a battle victory by competing for the flag in the virtual environment. During the game battle process, the first virtual object triggers the environment switching function of the first object by performing an attack operation on the first object, which may cause terrain interference to the virtual object having a hostile relationship; or may also have an enhancing effect on the first virtual object, which is not limited here.

In conclusion, the embodiment of this application provides a virtual picture display method, where a virtual environment picture including a first region is displayed from a perspective of a first virtual object, the first region including a first environment element; the first environment element is switched to a second environment element through an interaction operation for the first virtual object to interact with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 13:
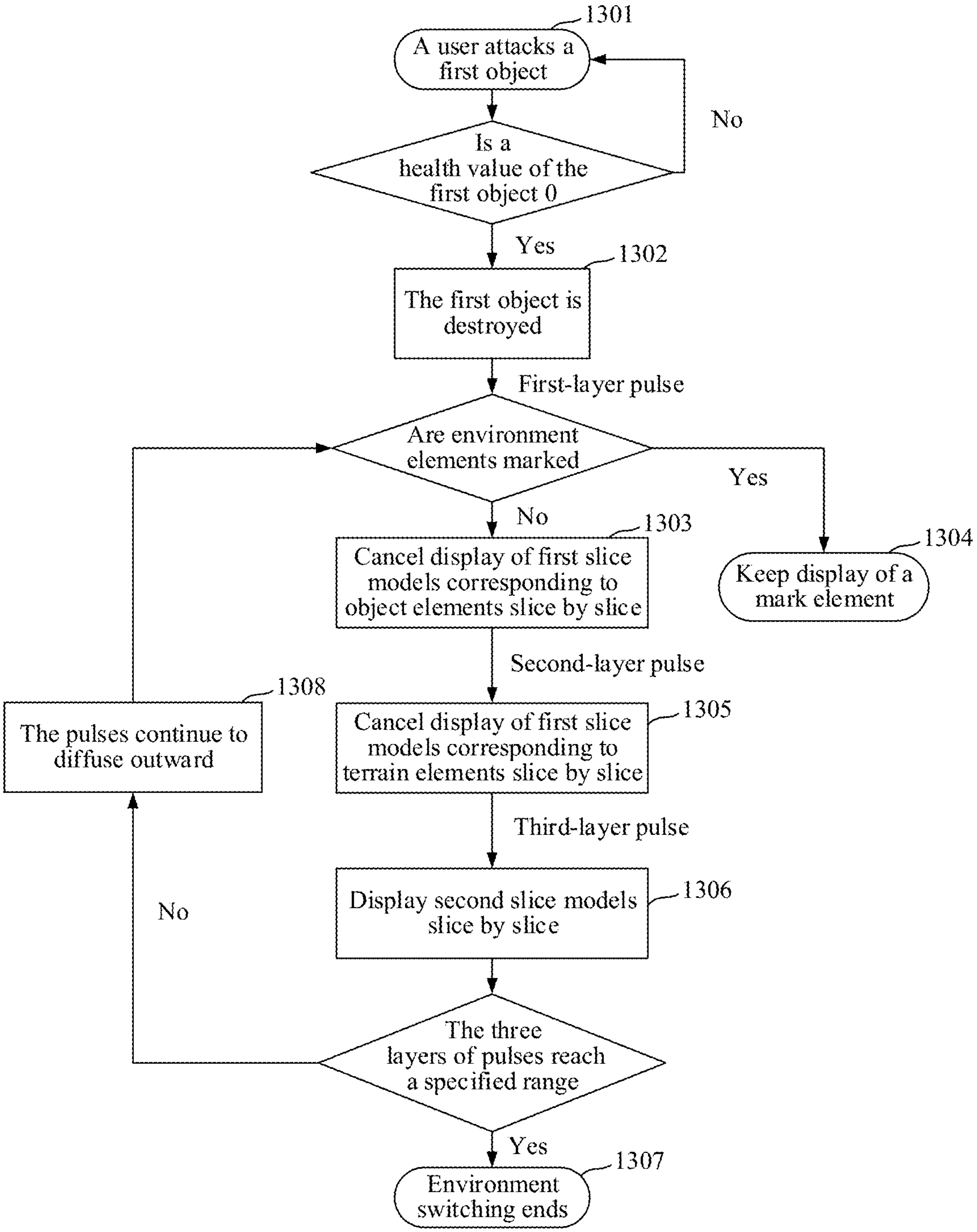
FIG. 13 is a flow chart of an element switching process according to an exemplary embodiment of this application.

In some embodiments, referring to FIG. 13, FIG. 13 shows a flow chart of an element switching process according to an exemplary embodiment of this application. The method includes the following steps:

Step 1301: A user attacks a first object.

A first user attacks a first object through a virtual prop. The first object has a health value, and the health value changes under the influence of attack. The first object includes an environment switching prop.

Step 1302: The first object is destroyed.

When the first object has a health value of 0 under the influence of an attack operation, this indicates that the first object meets a destruction condition, and an environment switching function of the first object is triggered. The environment switching function is an element switching process of switching a first environment element in a first region to a second environment element.

Step 1303: Cancel display of first slice models corresponding to object elements slice by slice.

Exemplarily, in the first-layer pulses, a determination of whether the environment elements are marked is made, and if not, step 1303 is performed.

Step 1304: Keep display of a mark element.

The element switching process is shown in a pulse switching mode, and includes three layers of pulses. By slicing a first model corresponding to a first environment element, n first slice models are obtained. In first-layer pulses, display of first slice models corresponding to object elements is canceled slice by slice.

In the first-layer pulses, a determination of whether the environment elements are marked is made, and if yes, that is, there is a mark element, step 1304 of keeping the display of the mark element is performed.

Step 1305: Cancel display of first slice models corresponding to terrain elements slice by slice.

In second-layer pulses, the first slice models corresponding to the terrain elements are displayed in a slice-by-slice cancel mode.

Step 1306: Cancel display of second slice models slice by slice.

In third-layer pulses, second slice models are displayed slice by slice based on disappearance of the first slice models, where the second slice models corresponding to terrain elements are first displayed slice by slice, and the second slice models corresponding to object elements are then displayed slice by slice.

After the third-layer pulses are completed, if the element switching process in the first region is not completed, step 1308 in which pulses continuously diffuse outward, and the element switching process in a pulse switching mode. Exemplarily, a determination of whether the three layers of pulses reach a specified range, and if yes, step 1307 is performed; and if not, step 1308 is performed.

Step 1307: Environment switching ends.

Step 1308: The pulses continue to diffuse outward.

After the element switching process is completed, the second environment element is displayed in the first region, and the environment switching ends.

In conclusion, the embodiment of this application provides a virtual picture display method, where a virtual environment picture including a first region is displayed from a perspective of a first virtual object, the first region including a first environment element; the first environment element is switched to a second environment element through an interaction operation for the first virtual object to interact with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 14:
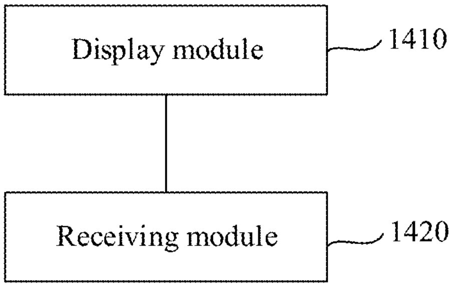
FIG. 14 is a structural block diagram of a virtual picture display apparatus according to an exemplary embodiment of this application.
Figure 15:
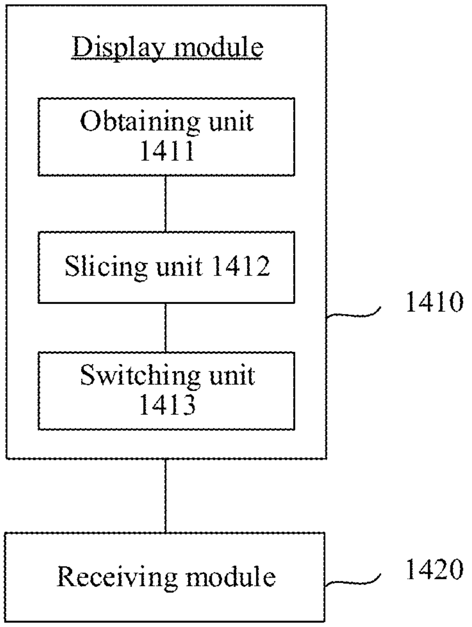
FIG. 15 is a structural block diagram of a virtual picture display apparatus according to another exemplary embodiment of this application.

FIG. 14 shows a structural block diagram of a virtual picture display apparatus according to an embodiment of this application. The apparatus has a function of performing the foregoing method embodiments, and the function may be implemented by hardware or may be implemented by hardware executing corresponding software. The apparatus may include:

a display module 1410, configured to display a virtual environment picture from a perspective of a first virtual object, the first virtual object being equipped with a virtual prop, and the virtual environment picture including a first object; and a receiving module 1420, configured to receive an interaction operation for the first virtual object to interact with the first object by using the virtual prop, the interaction operation being used for triggering an environment switching function of the first object, the environment switching function referring to a function of performing environment switching on a first region in a virtual environment, and the first region including a first environment element.

The display module 1410 is further configured to display, in response to the interaction operation and the first object meeting an environment switching condition, an element switching process of the first environment element. The element switching process is a process of switching the first environment element to a second environment element.

The display module 1410 is further configured to display, in response to completion of the element switching process, the second environment element located in the first region.

In an embodiment, the receiving module 1420 is further configured to receive an attack operation of the first virtual object on the first object using the virtual prop.

The display module 1410 is configured to: obtain, in response to the attack operation, a health value of the first object, the health value of the first object changing under the influence of the attack operation; and display, in response to the health value of the first object reaching a health threshold, the element switching process of the first environment element.

The receiving module 1420 is further configured to receive the attack operation of the first virtual object on the first object using a specified virtual prop. The specified virtual prop is used for changing the health value of the first object.

In an embodiment, the virtual environment includes the first virtual object and a second virtual object. The first virtual object performs a first attack operation on the first object, and the second virtual object performs a second attack operation on the first object.

The display module 1410 is further configured to: display, in response to the health value of the first object reaching the health threshold through the first attack operation, a first element switching process of the first environment element; and display, in response to the health value of the first object reaching the health threshold through the second attack operation, a second element switching process of the first environment element.

In an embodiment, the receiving module 1420 is further configured to receive a timing operation of the first virtual object on the first object. The timing operation is used for triggering the environment switching function of the first object through a timer.

The display module 1410 is further configured to display, in response to the timer reaching a timing duration, the element switching process of the first environment element.

In an embodiment, the receiving module 1420 is further configured to receive a mode configuration operation of the first virtual object for the first object. The mode configuration operation is used for configuring a trigger condition of the environment switching function.

The display module 1410 is further configured to display, in response to the first region meeting the trigger condition of the environment switching function, the element switching process of the first environment element.

In an embodiment, the receiving module 1420 is further configured to receive a touch operation on the first object. The touch operation is used for controlling the first virtual object to touch the first object.

The display module 1410 is further configured to display, in response to the touch operation meeting the environment switching condition, the element switching process of the first environment element.

In an embodiment, the receiving module 1420 is further configured to receive a position moving operation of the first virtual object on the first object. The position moving operation is used for changing a position of the first object in the virtual environment by movement.

The display module 1410 is further configured to display, in response to the position of the first object meeting the environment switching condition, the element switching process of the first environment element.

The display module 1410 is further configured to display the element switching process of the first environment element in a pulse switching mode.

In an embodiment, the display module 1410 includes:

an obtaining unit 1411, configured to obtain a first model of the first environment element, the first model being a three-dimensional model of the first environment element, the obtaining unit 1411 being further configured to obtain a second model of the second environment element, the second model being a three-dimensional model of the second environment element;

a slicing unit 1412, configured to slice the first model to obtain n first slice models, n being a positive integer, the slicing unit 1412 is further configured to slicing the second model to obtain m second slice models, m being a positive integer; and a switching unit 1413, configured to switch the first slice models and the second slice models based on the pulse switching mode to obtain the element switching process of the first environment element.

In an embodiment, the pulse switching mode includes first-layer pulses and second-layer pulses.

The switching unit 1413 is further configured to: cancel display of the n first slice models slice by slice in the first-layer pulses; and display the m second slice models slice by slice in the second-layer pulses based on disappearance of the first slice models to obtain the element switching process of the first environment element.

In an embodiment, the pulse switching mode further includes first-layer pulses, second-layer pulses and third-layer pulses, and the first region includes terrain elements and object elements.

The display module 1410 is further configured to: cancel display of the first slice models corresponding to the object elements slice by slice in the first-layer pulses; cancel display of the first slice models corresponding to the terrain elements slice by slice in the second-layer pulses; and display the second slice models slice by slice in the third-layer pulses based on disappearance of the first slice models to obtain the element switching process of the first environment element.

In conclusion, the embodiment of this application provides a virtual picture display apparatus, where a virtual environment picture including a first region is displayed from a perspective of a first virtual object, the first region including a first environment element; the first environment element is switched to a second environment element through an interaction operation with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 16:
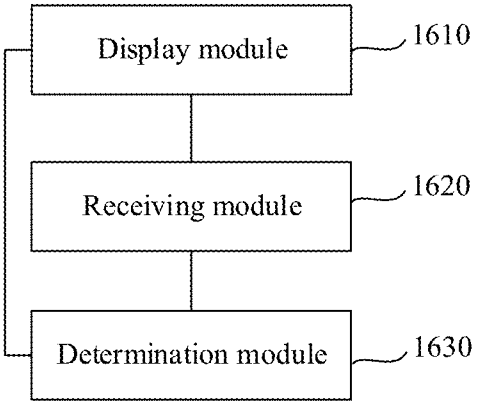
FIG. 16 is a structural block diagram of a virtual picture display apparatus according to another exemplary embodiment of this application.

FIG. 16 shows a structural block diagram of a virtual picture display apparatus according to an embodiment of this application. The apparatus has a function of performing the foregoing method embodiments, and the function may be implemented by hardware or may be implemented by hardware executing corresponding software. The apparatus may include:

a display module 1610, configured to display a virtual environment picture from a perspective of a first virtual object, the first virtual object being equipped with a first virtual prop, and the virtual environment picture including a first object; and a receiving module 1620, configured to receive an attack operation of the first virtual object on the first object using the first virtual prop, the attack operation being used for triggering an environment switching function of the first object, and the environment switching function referring to a function of performing environment switching on a first region in a virtual environment.

The display module 1610 is further configured to display, in response to the attack operation and the first object meeting an environment switching condition, an environment switching process.

In an embodiment, the virtual environment includes a first camp and a second camp, the first camp includes the first virtual object, the second camp includes a second virtual object, the second virtual object is equipped with a second virtual prop, the first camp and the second camp have a hostile relationship, and the second virtual prop is used for attacking the first object to realize the environment switching function. The virtual environment includes k enhancing props, the number of the enhancing props is used for determining a battle victory condition, and k is a positive integer.

The apparatus further includes:

a determination module 1630, configured to determine, in response to the number of enhancing props obtained by the first virtual object being greater than the number of enhancing props obtained by the second virtual object, that the first virtual object achieves a battle victory.

In conclusion, the embodiment of this application provides a virtual picture display apparatus, where a virtual environment picture including a first region is displayed from a perspective of a first virtual object, the first region including a first environment element; the first environment element is switched to a second environment element through an interaction operation with a first object in a virtual environment, and an element switching process is displayed; and a second environment element is displayed after completion of the element switching process, so that the diversity of elements in the virtual environment is enriched, the element switching efficiency in the virtual environment is improved, and the user can have more flexibility to switch the environment during a game battle.

Figure 17:
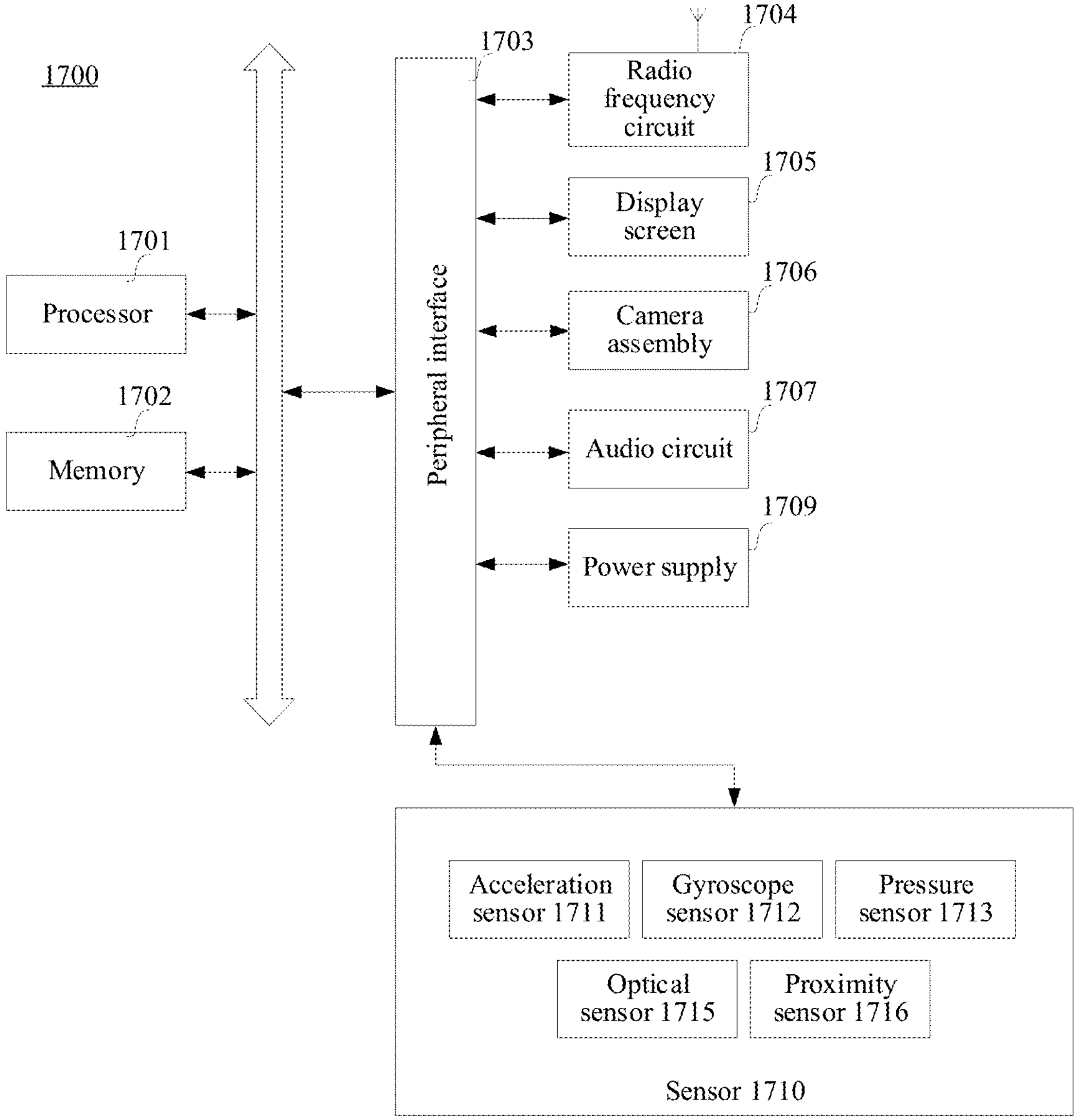
FIG. 17 is a structural block diagram of a terminal according to an exemplary embodiment of this application.

FIG. 17 shows a structural block diagram of a terminal 1700 according to an exemplary embodiment of this application. The terminal 1700 may be: a smartphone, a tablet computer, a Moving Picture Experts Group Audio Layer III (MP3) player, a Moving Picture Experts Group Audio Layer IV (MP4) player, a notebook computer, or a desktop computer. The terminal 1700 may also be referred to as another name such as user equipment, a portable terminal, a laptop terminal, or a desktop terminal.

Generally, the terminal 1700 includes: a processor 1701 and a memory 1702.

The processor 1701 may include one or more processing cores, for example, a 4-core processor or an 8-core processor. The processor 1701 may be implemented in at least one hardware form of a digital signal processor (DSP), a field-programmable gate array (FPGA), and a programmable logic array (PLA). The processor 1701 may also include a main processor and a coprocessor. The main processor is a processor configured to process data in a wake-up state, and is also referred to as a central processing unit (CPU). The coprocessor is a low power consumption processor configured to process the data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be non-transient. The memory 1702 may further include a high-speed random access memory and a nonvolatile memory, for example, one or more disk storage devices or flash storage devices. In some embodiments, the non-transitory computer-readable storage medium in the memory 1702 is configured to store at least one instruction, and the at least one instruction being used for be executed by the processor 1701 to implement the virtual picture display method provided in the method embodiments of this application.

In some embodiments, the terminal 1700 may further include: a peripheral interface 1703 and at least one peripheral. The processor 1701, the memory 1702, and the peripheral interface 1703 may be connected through a bus or a signal cable. Each peripheral may be connected to the peripheral interface 1703 through a bus, a signal cable, or a circuit board. Specifically, The peripheral includes: at least one of a radio frequency (RF) circuit 1704, a display screen 1705, a camera component 1706, an audio circuit 1707, and a power supply 1709.

The peripheral interface 1703 may be configured to connect the at least one peripheral related to input/output (I/O) to the processor 1701 and the memory 1702. In some embodiments, the processor 1701, the memory 1702 and the peripheral device interface 1703 are integrated on a same chip or circuit board. In some other embodiments, any one or two of the processor 1701, the memory 1702, and the peripheral device interface 1703 may be implemented on a single chip or circuit board. This is not limited in this embodiment.

The RF circuit 1704 is configured to receive and transmit an RF signal, also referred to as an electromagnetic signal. The RF circuit 1704 communicates with a communication network and other communication devices through the electromagnetic signal. The RF circuit 1704 converts an electric signal into an electromagnetic signal for transmission, or converts a received electromagnetic signal into an electric signal. In some embodiments, the RF circuit 1704 includes: an antenna system, an RF transceiver, one or more amplifiers, a tuner, an oscillator, a digital signal processor, a codec chip set, a subscriber identity module card, and the like. The RF circuit 1704 may communicate with another terminal by using at least one wireless communications protocol. The wireless communication protocol includes, but is not limited to: a world wide web, a metropolitan area network, an intranet, generations of mobile communication networks (2G, 3G, 4G, and 5G), a wireless local area network and/or a wireless fidelity (WiFi) network. In some embodiments, the RF circuit 1704 may further include a circuit related to NFC, which is not limited in this application.

The display screen 1705 is configured to display a user interface (UI). The UI may include a graph, text, an icon, a video, and any combination thereof. When the display screen 1705 is a touch display screen, the display screen 1705 further has a capability of acquiring a touch signal on or above a surface of the display screen 1705. The touch signal may be inputted to the processor 1701 as a control signal for processing. In this case, the display screen 1705 may be further configured to provide a virtual button and/or a virtual keyboard that are/is also referred to as a soft button and/or a soft keyboard. In some embodiments, there may one display screen 1705, which is disposed on the front panel of the terminal 1700. In some other embodiments, there may at least two display screens 1705, which are on different surfaces of the terminal 1700 or designed in a folded manner. In still some other embodiments, the display screen 1705 may be a flexible display screen, which is disposed on a curved surface or a folding surface of the terminal 1700. Even, the display screen 1705 may be further set in a non-rectangular irregular pattern, namely, a special-shaped screen. The display screen 1705 may be prepared by using materials such as a liquid crystal display (LCD), an organic light-emitting diode (OLED), or the like.

The camera component 1706 is configured to capture images or videos. In some embodiments, the camera component 1706 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve a background blur function through fusion of the main camera and the depth-of-field camera, panoramic photographing and virtual reality (VR) photographing functions through fusion of the main camera and the wide-angle camera, or other fusion photographing functions. In some embodiments, the camera component 1706 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1707 may include a microphone and a speaker. The microphone is configured to acquire sound waves of a user and an environment, and convert the sound waves into an electrical signal to input to the processor 1701 for processing, or input to the RF circuit 1704 for implementing voice communication. For the purpose of stereo acquisition or noise reduction, there may be a plurality of microphones, which are respectively disposed at different portions of the terminal 1700. The microphone may further be an array microphone or an omni-directional acquisition type microphone. The speaker is configured to convert electric signals from the processor 1701 or the RF circuit 1704 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1707 may further include an earphone jack.

The power supply 1709 is configured to supply power to components in the terminal 1700. The power supply 1709 may be an alternating current, a direct current, a primary battery, or a rechargeable battery. When the power supply 1709 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1700 further includes one or more sensors 1710. The one or more sensors 1710 include, but are not limited to: an acceleration sensor 1711, a gyroscope sensor 1712, a pressure sensor 1713, an optical sensor 1715, and a proximity sensor 1716.

The acceleration sensor 1711 may detect a magnitude of acceleration on three coordinate axes of a coordinate system established with the terminal 1700. For example, the acceleration sensor 1711 may be configured to detect components of gravity acceleration on the three coordinate axes. The processor 1701 may control, according to a gravity acceleration signal acquired by the acceleration sensor 1711, the touch display screen 1705 to display the UI in a landscape view or a portrait view.

The gyroscope sensor 1712 may detect a body direction and a rotation angle of the terminal 1700. The gyroscope sensor 1712 may cooperate with the acceleration sensor 1711 to acquire a 3D action by the user on the terminal 1700. The processor 1701 may implement the following functions according to the data acquired by the gyroscope sensor 1712: motion sensing (such as changing the UI according to a tilt operation of the user), image stabilization at shooting, game control, and inertial navigation.

The pressure sensor 1713 may be disposed at a side frame of the terminal 1700 and/or a lower layer of the display screen 1705. When the pressure sensor 1713 is disposed at the side frame of the terminal 1700, a holding signal of the user on the terminal 1700 may be detected. The processor 1701 performs left and right hand recognition or a quick operation according to the holding signal acquired by the pressure sensor 1713. When the pressure sensor 1713 is disposed on the low layer of the touch display screen 1705, the processor 1701 controls, according to a pressure operation of the user on the display screen 1705, an operable control on the UI. The operable control includes at least one of a button control, a scroll-bar control, an icon control, and a menu control.

The optical sensor 1715 is configured to acquire ambient light intensity. In an embodiment, the processor 1701 may control the display brightness of the touch display screen 1705 according to the ambient light intensity acquired by the optical sensor 1715. Specifically, when the ambient light intensity is relatively high, the display brightness of the touch display screen 1705 is increased. When the ambient light intensity is relatively low, the display brightness of the touch display screen 1705 is decreased. In another embodiment, the processor 1701 may further dynamically adjust a camera parameter of the camera component 1706 according to the ambient light intensity acquired by the optical sensor 1715.

The proximity sensor 1716, also referred to as a distance sensor, is generally disposed on the front panel of the terminal 1700. The proximity sensor 1716 is configured to acquire a distance between the user and the front surface of the terminal 1700. In an embodiment, when the proximity sensor 1716 detects that the distance between the user and the front surface of the terminal 1700 gradually decreases, the touch display screen 1705 is controlled by the processor 1701 to switch from the screen-on state to the screen-off state. When the proximity sensor 1716 detects that the distance between the user and the front surface of the terminal 1700 gradually increases, the touch display screen 1705 is controlled by the processor 1701 to switch from the screen-off state to the screen-on state.

A person skilled in the art may understand that the structure shown in FIG. 17 constitutes no limitation on the terminal 1700, and the terminal may include more or fewer components than those shown in the figure, or some components may be combined, or a different component deployment may be used.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiments, or may be a computer-readable storage medium that exists independently and that is not assembled in a terminal. The computer-readable storage medium stores at least one instruction, at least one program, and a code set or an instruction set, and the at least one instruction, the at least one program, and the code set or the instruction set is loaded and executed by the processor to implement the virtual picture display method according to any one of the foregoing embodiments.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual picture display method, performed by a computer device, the method comprising:

displaying a virtual environment picture, the virtual environment picture comprising a first object and a virtual prop controlled by a first virtual object;

receiving an interaction operation for the first virtual object to interact with the first object by using the virtual prop;

in response to the interaction operation and the first object meeting an environment switching condition, displaying an element switching process of switching a first environment element located in a first region of the virtual environment to a second environment element in a pulse switching mode; and in response to completion of the element switching process, displaying the second environment element located in the first region of the virtual environment.

2. The method according to claim 1, wherein the receiving an interaction operation for the first virtual object to interact with the first object by using the virtual prop comprises:

receiving an attack operation of the first virtual object on the first object using the virtual prop; and the displaying an element switching process of switching a first environment element located in a first region of the virtual environment to a second environment element comprises:

in response to the attack operation, changing a health value of the first object based on the attack operation; and in response to the health value of the first object reaching a health threshold, displaying the element switching process.

3. The method according to claim 2, wherein the receiving an attack operation of the first virtual object on the first object using the virtual prop comprises:

receiving the attack operation of the first virtual object on the first object using a specified virtual prop for changing the health value of the first object.

4. The method according to claim 1, wherein the receiving an interaction operation for the first virtual object to interact with the first object by using the virtual prop comprises:

receiving a timing operation of the first virtual object on the first object through a timer; and the displaying an element switching process of switching a first environment element located in a first region of the virtual environment to a second environment element comprises:

in response to the timer reaching a timing duration, displaying the element switching process.

5. The method according to claim 1, wherein the receiving an interaction operation for the first virtual object to interact with the first object by using the virtual prop comprises:

receiving a mode configuration operation of the first virtual object for the first object; and the displaying an element switching process of switching a first environment element located in a first region of the virtual environment to a second environment element comprises:

in response to the mode configuration operation meeting a predefined trigger condition, displaying the element switching process of the first environment element.

6. The method according to claim 1, wherein the receiving an interaction operation for the first virtual object to interact with the first object by using the virtual prop comprises:

receiving a touch operation of the first virtual object on the first object, the touch operation being used for controlling the first virtual object to touch the first object; and the displaying an element switching process of switching a first environment element located in a first region of the virtual environment to a second environment element comprises:

in response to the touch operation meeting the environment switching condition, displaying the element switching process.

7. The method according to claim 1, wherein the receiving an interaction operation for the first virtual object to interact with the first object by using the virtual prop comprises:

receiving a position moving operation of the first virtual object on the first object, the position moving operation being used for changing a position of the first object in the virtual environment by controlling the first virtual object to move the first object; and the displaying an element switching process of switching a first environment element located in a first region of the virtual environment to a second environment element comprises:

in response to the position of the first object meeting the environment switching condition, displaying the element switching process.

8. A computer device, comprising a processor and a memory, the memory storing at least one instruction, and the at least one instruction being loaded and executed by the processor and causing the computer device to implement a virtual picture display method including:

displaying a virtual environment picture, the virtual environment picture comprising a first object and a virtual prop controlled by a first virtual object;

receiving an interaction operation for the first virtual object to interact with the first object by using the virtual prop;

in response to the interaction operation and the first object meeting an environment switching condition, displaying an element switching process of switching a first environment element located in a first region of the virtual environment to a second environment element in a pulse switching mode; and in response to completion of the element switching process, displaying the second environment element located in the first region of the virtual environment.

9. The computer device according to claim 8, wherein the receiving an interaction operation for the first virtual object to interact with the first object by using the virtual prop comprises:

receiving an attack operation of the first virtual object on the first object using the virtual prop; and the displaying an element switching process of switching a first environment element located in a first region of the virtual environment to a second environment element comprises:

in response to the attack operation, changing a health value of the first object based on the attack operation; and in response to the health value of the first object reaching a health threshold, displaying the element switching process.

10. The computer device according to claim 9, wherein the receiving an attack operation of the first virtual object on the first object using the virtual prop comprises:

receiving the attack operation of the first virtual object on the first object using a specified virtual prop for changing the health value of the first object.

11. The computer device according to claim 8, wherein the receiving an interaction operation for the first virtual object to interact with the first object by using the virtual prop comprises:

receiving a timing operation of the first virtual object on the first object through a timer; and the displaying an element switching process of switching a first environment element located in a first region of the virtual environment to a second environment element comprises:

in response to the timer reaching a timing duration, displaying the element switching process.

12. The computer device according to claim 8, wherein the receiving an interaction operation for the first virtual object to interact with the first object by using the virtual prop comprises:

receiving a mode configuration operation of the first virtual object for the first object; and the displaying an element switching process of switching a first environment element located in a first region of the virtual environment to a second environment element comprises:

in response to the mode configuration operation meeting a predefined trigger condition, displaying the element switching process of the first environment element.

13. The computer device according to claim 8, wherein the receiving an interaction operation for the first virtual object to interact with the first object by using the virtual prop comprises:

receiving a touch operation of the first virtual object on the first object, the touch operation being used for controlling the first virtual object to touch the first object; and the displaying an element switching process of switching a first environment element located in a first region of the virtual environment to a second environment element comprises:

in response to the touch operation meeting the environment switching condition, displaying the element switching process.

14. The computer device according to claim 8, wherein the receiving an interaction operation for the first virtual object to interact with the first object by using the virtual prop comprises:

receiving a position moving operation of the first virtual object on the first object, the position moving operation being used for changing a position of the first object in the virtual environment by controlling the first virtual object to move the first object; and the displaying an element switching process of switching a first environment element located in a first region of the virtual environment to a second environment element comprises:

in response to the position of the first object meeting the environment switching condition, displaying the element switching process.

15. A non-transitory computer-readable storage medium, storing at least one program code, the program code being loaded and executed by a processor of a computer device and causing the computer device to implement a virtual picture display method including:

displaying a virtual environment picture, the virtual environment picture comprising a first object and a virtual prop controlled by a first virtual object;

receiving an interaction operation for the first virtual object to interact with the first object by using the virtual prop;

in response to the interaction operation and the first object meeting an environment switching condition, displaying an element switching process of switching a first environment element located in a first region of the virtual environment to a second environment element in a pulse switching mode; and in response to completion of the element switching process, displaying the second environment element located in the first region of the virtual environment.

16. The non-transitory computer-readable storage medium according to claim 15, wherein the receiving an interaction operation for the first virtual object to interact with the first object by using the virtual prop comprises:

receiving an attack operation of the first virtual object on the first object using the virtual prop; and the displaying an element switching process of switching a first environment element located in a first region of the virtual environment to a second environment element comprises:

in response to the attack operation, changing a health value of the first object based on the attack operation; and in response to the health value of the first object reaching a health threshold, displaying the element switching process.

17. The non-transitory computer-readable storage medium according to claim 15, wherein the receiving an interaction operation for the first virtual object to interact with the first object by using the virtual prop comprises:

receiving a timing operation of the first virtual object on the first object through a timer; and the displaying an element switching process of switching a first environment element located in a first region of the virtual environment to a second environment element comprises:

in response to the timer reaching a timing duration, displaying the element switching process.

18. The non-transitory computer-readable storage medium according to claim 15, wherein the receiving an interaction operation for the first virtual object to interact with the first object by using the virtual prop comprises:

receiving a mode configuration operation of the first virtual object for the first object; and the displaying an element switching process of switching a first environment element located in a first region of the virtual environment to a second environment element comprises:

in response to the mode configuration operation meeting a predefined trigger condition, displaying the element switching process of the first environment element.

19. The non-transitory computer-readable storage medium according to claim 15, wherein the receiving an interaction operation for the first virtual object to interact with the first object by using the virtual prop comprises:

receiving a touch operation of the first virtual object on the first object, the touch operation being used for controlling the first virtual object to touch the first object; and the displaying an element switching process of switching a first environment element located in a first region of the virtual environment to a second environment element comprises:

in response to the touch operation meeting the environment switching condition, displaying the element switching process.

20. The non-transitory computer-readable storage medium according to claim 15, wherein the receiving an interaction operation for the first virtual object to interact with the first object by using the virtual prop comprises:

receiving a position moving operation of the first virtual object on the first object, the position moving operation being used for changing a position of the first object in the virtual environment by controlling the first virtual object to move the first object; and the displaying an element switching process of switching a first environment element located in a first region of the virtual environment to a second environment element comprises:

in response to the position of the first object meeting the environment switching condition, displaying the element switching process.

* * * * *